(12) United States Patent
Bunsen

(10) Patent No.: US 9,954,397 B2
(45) Date of Patent: Apr. 24, 2018

(54) FEED UNIT INCLUDING POWER TRANSMISSION COIL AND FEED SYSTEM

(71) Applicant: Sony Corporation, Tokyo (JP)

(72) Inventor: Keigo Bunsen, Kanagawa (JP)

(73) Assignee: Sony Corporation, Tokyo (JP)

( * ) Notice: Subject to any disclaimer, the term of this patent is extended or adjusted under 35 U.S.C. 154(b) by 669 days.

(21) Appl. No.: 14/199,451

(22) Filed: Mar. 6, 2014

(65) Prior Publication Data

US 2014/0300196 A1 Oct. 9, 2014

(30) Foreign Application Priority Data

Apr. 8, 2013 (JP) .................................. 2013-080429

(51) Int. Cl.
| | |
|---|---|
| H02J 5/00 | (2016.01) |
| H02J 50/12 | (2016.01) |
| H02J 50/10 | (2016.01) |
| H04B 5/00 | (2006.01) |
| H02J 7/02 | (2016.01) |
| H02J 7/00 | (2006.01) |

(52) U.S. Cl.
CPC .............. *H02J 50/12* (2016.02); *H02J 5/005* (2013.01); *H02J 7/025* (2013.01); *H02J 50/10* (2016.02); *H04B 5/0037* (2013.01); *H02J 2007/0096* (2013.01)

(58) Field of Classification Search
CPC ............................... H02J 50/10; H04B 5/0037
USPC ........................................................ 307/104
See application file for complete search history.

(56) References Cited

U.S. PATENT DOCUMENTS

| | | | | |
|---|---|---|---|---|
| 2013/0002034 A1* | 1/2013 | Onizuka | ................. | H02J 5/005 307/104 |
| 2013/0076306 A1* | 3/2013 | Lee | ......................... | H02J 7/025 320/108 |
| 2013/0249299 A1* | 9/2013 | Shijo | ....................... | H02J 5/005 307/80 |
| 2013/0257165 A1* | 10/2013 | Singh | ....................... | G01V 3/12 307/98 |
| 2014/0094116 A1* | 4/2014 | Walley | ..................... | H02J 7/025 455/41.1 |
| 2014/0184150 A1* | 7/2014 | Walley | ..................... | H02J 5/005 320/108 |

(Continued)

FOREIGN PATENT DOCUMENTS

JP 2011-045161 3/2011

*Primary Examiner* — Adi Amrany
(74) *Attorney, Agent, or Firm* — Michael Best & Friedrich LLP

(57) ABSTRACT

The present disclosure includes a feed unit and a feed system. The feed unit includes a power transmission coil and a coupling coefficient calculation section. The power transmission coil is configured to transmit power to a power reception coil of a receiving unit using a magnetic field. The coupling coefficient calculation section is configured to measure frequency characteristics of input impedance of a rectification circuit of the receiving unit, the rectification circuit being in a non-operating state. The coupling coefficient calculation section is also configured to calculate a coupling coefficient between the power transmission coil and the power reception coil using the frequency characteristics of the input impedance of the rectification circuit that have been measured.

17 Claims, 17 Drawing Sheets

(56) References Cited

U.S. PATENT DOCUMENTS

| | | | |
|---|---|---|---|
| 2014/0252868 A1* | 9/2014 | Yamada | H01F 38/14 |
| | | | 307/104 |
| 2015/0048688 A1* | 2/2015 | Yamakawa | B60L 11/182 |
| | | | 307/104 |
| 2015/0326028 A1* | 11/2015 | Suzuki | H02J 5/005 |
| | | | 307/104 |

* cited by examiner

| L1 | 17 ($\mu$H) |
|---|---|
| L2 | 17 ($\mu$H) |
| C1 | 150 (nF) |
| C2 | 150 (nF) |
| C2p | 1.5 (nF) |

FIG. 7

FEED UNIT INCLUDING POWER TRANSMISSION COIL AND FEED SYSTEM

CROSS REFERENCE TO RELATED APPLICATIONS

This application claims the benefit of Japanese Priority Patent Application JP 2013-80429 filed Apr. 8, 2013, the entire contents of which are incorporated herein by reference.

BACKGROUND

The present disclosure relates to a feed system performing non-contact power supply (power transmission) on a unit to be fed with power such as an electronic apparatus, and to a feed unit applied to such a feed system.

In recent years, a feed system (a non-contact feed system, or a wireless charging system) performing non-contact power supply on consumer electronics devices (CE devices) such as mobile phones and portable music players has attracted attention. Accordingly, charging is allowed to be started by not inserting (connecting) a connector of a power supply such as an AC adapter into a unit but placing an electronic apparatus (a secondary-side unit) on a charging tray (a primary-side unit). In other words, terminal connection between the electronic apparatus and the charging tray is unnecessary.

As a method of performing non-contact power supply in such a way, an electromagnetic induction method is well known. In addition, a non-contact feed system using a method called magnetic resonance method that uses electromagnetic resonance phenomenon has attracted attention. Such a non-contact feed system has been disclosed in, for example, Japanese Unexamined Patent Application Publication Nos. 2011-45161 and 2012-7046, and the like.

SUMMARY

Incidentally, in the non-contact feed system described above, a coupling coefficient between a primary-side unit (a power transmission coil) and a secondary-side unit (a power reception coil) is desired to be obtained easily. Therefore, proportion of a method that is capable of easily obtaining such a coupling coefficient is demanded.

It is desirable to provide a feed unit and a feed system that are capable of easily obtaining a coupling coefficient in power transmission using a magnetic field.

According to an embodiment of the disclosure, there is provided a feed unit including: a power transmission coil configured to perform power transmission using a magnetic field; a coupling coefficient calculation section configured to calculate a coupling coefficient between the power transmission coil and a power reception coil in a unit to be fed with power. The coupling coefficient calculation section measures frequency characteristics of input impedance in a non-operating state of a rectification circuit in the unit to be fed with power, and uses a measurement result of the frequency characteristics to calculate the coupling coefficient.

According to an embodiment of the disclosure, there is provided a feed system provided with one or a plurality of electronic apparatuses (units to be fed with power) and a feed unit. The one or the plurality of electronic apparatuses each have a power reception coil and a rectification circuit, and the feed unit is configured to perform power transmission using a magnetic field to the electronic apparatuses. The feed unit includes: a power transmission coil configured to perform the power transmission; a coupling coefficient calculation section configured to calculate a coupling coefficient between the power transmission coil and the power reception coil. The coupling coefficient calculation section measures frequency characteristics of input impedance in a non-operating state of the rectification circuit, and uses a measurement result of the frequency characteristics to calculate the coupling coefficient.

In the feed unit and the feed system according to the respective embodiments of the disclosure, the frequency characteristics of the input impedance in the non-operating state of the rectification circuit in the unit to be fed with power (the electronic apparatus) are measured, and the measurement result of the frequency characteristics are used to calculate the coupling coefficient between the power transmission coil and the power reception coil. Therefore, it is possible to obtain the coupling coefficient without using a complicated method in which, for example, dynamic control is performed on the unit to be fed with power.

In the feed unit and the feed system according to the respective embodiments of the disclosure, the coupling coefficient is calculated using the measurement result of the frequency characteristics of the input impedance in the non-operating state of the rectification circuit. Therefore, it is possible to obtain the coupling coefficient without using a complicated method. Consequently, it is possible to easily obtain the coupling coefficient used in the power transmission using a magnetic field.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 7 is a diagram illustrating inductance values and capacitance values according to Examples 1 and 2.

DETAILED DESCRIPTION

Hereinafter, some embodiments of the present disclosure will be described in detail with reference to drawings. Note that description will be given in the following order.
1. First Embodiment (an example of obtaining a coupling coefficient using frequencies at a minimum value and at a maximum value)
2. Second Embodiment (an example of obtaining a coupling coefficient using frequencies at two minimum values)
3. Modifications 1 and 2 (other arrangement configuration examples of a bypass route in a secondary-side unit)
4. Third Embodiment (an example of setting feeding parameters using the obtained coupling coefficient)
5. Fourth Embodiment (an example of detecting presence or absence of a unit to be fed with power together with obtaining a coupling coefficient)
6. Fifth Embodiment (an example of performing power transmission control according to magnitude of the obtained coupling coefficient)
7. Other Modifications First Embodiment General Configuration of Feed System 4

Figure 1:
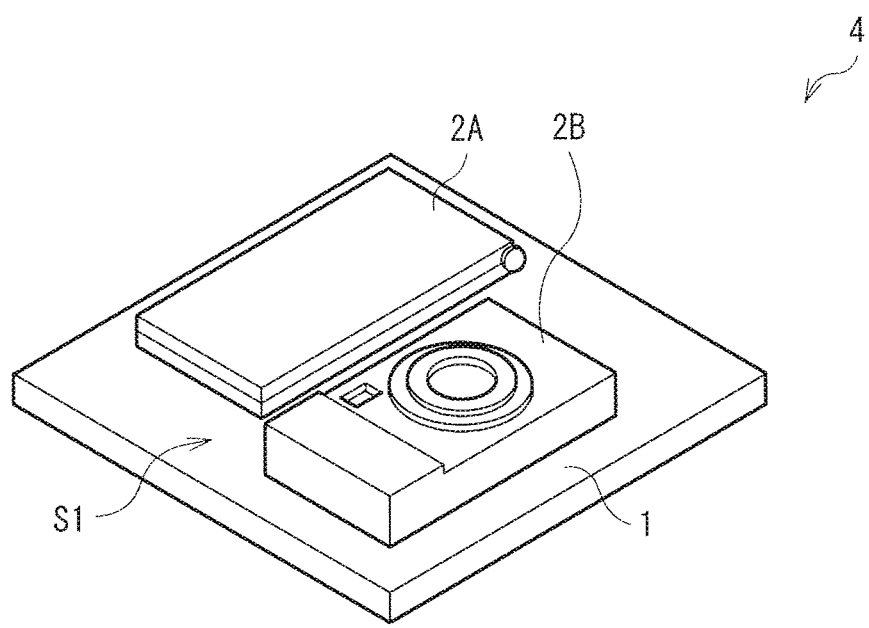
FIG. 1 is a perspective view illustrating an appearance configuration example of a feed system according to a first embodiment of the present disclosure.
Figure 2:
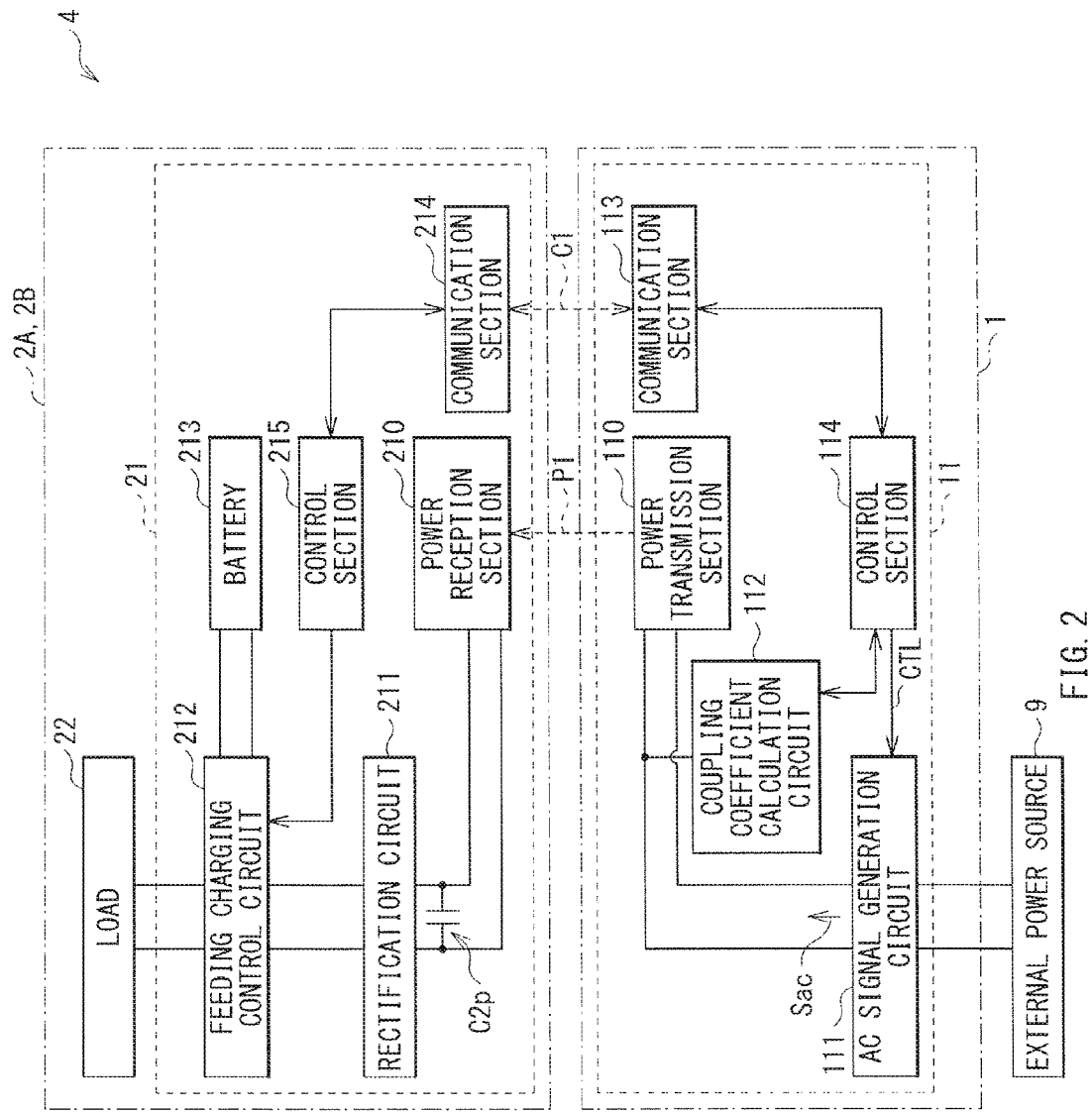
FIG. 2 is a block diagram illustrating a detailed configuration example of the feed system illustrated in FIG. 1.

FIG. 1 illustrates an appearance configuration example of a feed system (a feed system 4) according to a first embodiment of the present disclosure, and FIG. 2 illustrates a block configuration example of the feed system 4. The feed system 4 is a system (a non-contact feed system) performing non-contact power transmission (power supply, power feeding, or power transmission) using a magnetic field (using magnetic resonance, electromagnetic induction, and the like, hereinafter the same). The feed system 4 includes a feed unit 1 (a primary-side unit), and one or a plurality of electronic apparatuses (in this case, two electronic apparatuses 2A and 2B, secondary-side units) as units to be fed with power.

As illustrated in FIG. 1, for example, in the feed system 4, the electronic apparatuses 2A and 2B are placed (or closely disposed) on a feeding surface (a power transmission surface) S1 of the feed unit 1 so that the power transmission is performed from the feed unit 1 to the electronic apparatuses 2A and 2B. In this case, in consideration of the case where the power transmission is performed on the plurality of electronic apparatuses 2A and 2B at the same time or in a time-divisional manner (sequentially), the feed unit 1 has a mat shape (a tray shape) in which an area of the feeding surface S1 is larger than the size of the electronic apparatuses 2A and 2B, etc., to be fed with power.

(Feed Unit 1)

As described above, the feed unit 1 is a unit (a charging tray) transmitting power to the electronic apparatuses 2A and 2B using a magnetic field. As illustrated in FIG. 2, for example, the feed unit 1 may include a power transmission device 11 including a power transmission section 110, an AC signal generation circuit (an AC signal generation section, or a high-frequency power generation circuit) 111, a coupling coefficient calculation circuit (a coupling coefficient calculation section) 112, a communication section 113, and a control section 114. Moreover, a not-illustrated switch (a switching element SW2 described later) is provided in the power transmission device 11.

The power transmission section 110 is configured to include a power transmission coil (a primary-side coil) L1, a capacitor C1 (a resonance capacitor), and the like, that will be described later. An LC resonance circuit is configured using the power transmission coil L1 and the capacitor C1 as will be described later. The power transmission section 110 uses the power transmission coil L1 and the capacitor C1 to transmit power to the electronic apparatuses 2A and 2B (in detail, a power reception section 210 described later) with use of an AC magnetic field (see an arrow P1 in FIG. 2). More specifically, the power transmission section 110 has a function of radiating a magnetic field (a magnetic flux) from the feeding surface S1 toward the electronic apparatuses 2A and 2B.

For example, the AC signal generation circuit 111 is a circuit that uses power supplied from an external power source 9 (a master power source) of the feed unit 1 to generate a predetermined AC signal Sac (high-frequency power) for power transmission. The AC signal Sac is supplied toward the power transmission section 110. Such an AC signal generation circuit 111 may be configured using, for example, a switching amplifier including a switching element SW1 described later. Note that, as the external power source 9, for example, a normal AC adapter, a power source (power supply capacity: 500 mA, source voltage: about 5 V) of universal serial bus (USB) 2.0 that is provided in a personal computer (PC), and the like may be used.

The coupling coefficient calculation circuit 112 is a circuit that calculates a coupling coefficient k between the power transmission coil L1 described later and a power reception coil L2 described later in each of the electronic apparatuses 2A and 2B. The coupling coefficient k is a parameter representing sharing degree of a magnetic flux between the power transmission coil L1 and the power reception coil L2.

Note that the detail of a method of calculating the coupling coefficient k by the coupling coefficient calculation circuit 112 will be described later.

The communication section 113 performs predetermined mutual communication operation with a communication section 214 described later in each of the electronic apparatuses 2A and 2B (see an arrow C1 in FIG. 2).

The control section 114 performs various control operation for the entire feed unit 1 (the entire feed system 4). Specifically, for example, the control section 114 may have a function of performing optimizing control of the transmitted power, a function of authenticating a unit to be fed with power, a function of detecting a unit to be fed with power located in the vicinity thereof, a function of detecting a contaminant such as dissimilar metal, and the like, in addition to the function of controlling the power transmission operation by the power transmission section 110 and the communication operation by the communication section 113. Moreover, in the first embodiment, the control section 114 also has a function of controlling the operation of calculating the coupling coefficient by the coupling coefficient calculation circuit 112. In this case, to control the power transmission operation described above, the control section 114 uses a predetermined control signal CTL (a control signal for power transmission) described later to control the operation of the AC signal generation circuit 111. Such a control section 114 may be configured using, for example, a microcomputer, a pulse generator, and the like.

(Electronic Apparatuses 2A and 2B)

For example, each of the electronic apparatuses 2A and 2B is configured of a stationary electronic apparatus typified by a television receiver, a portable electronic apparatus including a rechargeable battery (battery), typified by a mobile phone and a digital camera, or the like. For example, as illustrated in FIG. 2, these electronic apparatuses 2A and 2B each may include a power reception device 21, and a load 22 that performs predetermined operation (operation of exerting functions as an electronic apparatus) based on power supplied from the power reception device 21. In addition, the power reception device 21 may include the power reception section 210, a rectification circuit 211, a feeding charging control circuit 212, a battery 213, the communication section 214, a control section 215, and a capacitor C2$p$. Note that the capacitor C2$p$ corresponds to a specific example of "capacitor" in the present disclosure.

The power reception section 210 is configured to include a power reception coil (a secondary-side coil) L2, a capacitor C2 (a resonance capacitor), and the like, that will be described later. An LC resonance circuit is configured using the power reception coil L2, the capacitor C2, and the above-described capacitor C2$p$ as will be described later. The power reception section 210 has a function of receiving power (transmitted power) transmitted from the power transmission section 110 in the feed unit 1 with use of the power reception coil L2, the capacitor C2, and the like.

The rectification circuit 211 is a circuit that rectifies the transmitted power (AC power) supplied from the power reception section 210 to generate DC power.

The feeding charging control circuit 212 is a circuit that performs charging control to the battery 213 and performs feeding control to the load 22, based on the DC power output from the rectification circuit 211.

The battery 213 stores the power therein according to the charging control by the feeding charging control circuit 212, and may be configured using, for example, a rechargeable battery (a secondary battery) such as a lithium ion battery.

The communication section 214 performs the above-described predetermined mutual communication operation with the communication section 113 in the feed unit 1 (see the arrow C1 in FIG. 2).

The control section 215 performs various control operation for the entire electronic apparatus 2A or the entire electronic apparatus 2B (the entire feed system 4). Specifically, for example, the control section 215 may have a function of performing optimizing control of the received power, a function of controlling the operation of the feeding charging control circuit 212, and the like, in addition to the function of controlling the power reception operation by the power reception section 210 and the communication operation by the communication section 214. Such a control section 215 may be configured using, for example, a microcomputer or the like.

(Detailed Configuration of Feed Unit 1 and Electronic Apparatuses 2A and 2B)

Figure 3:
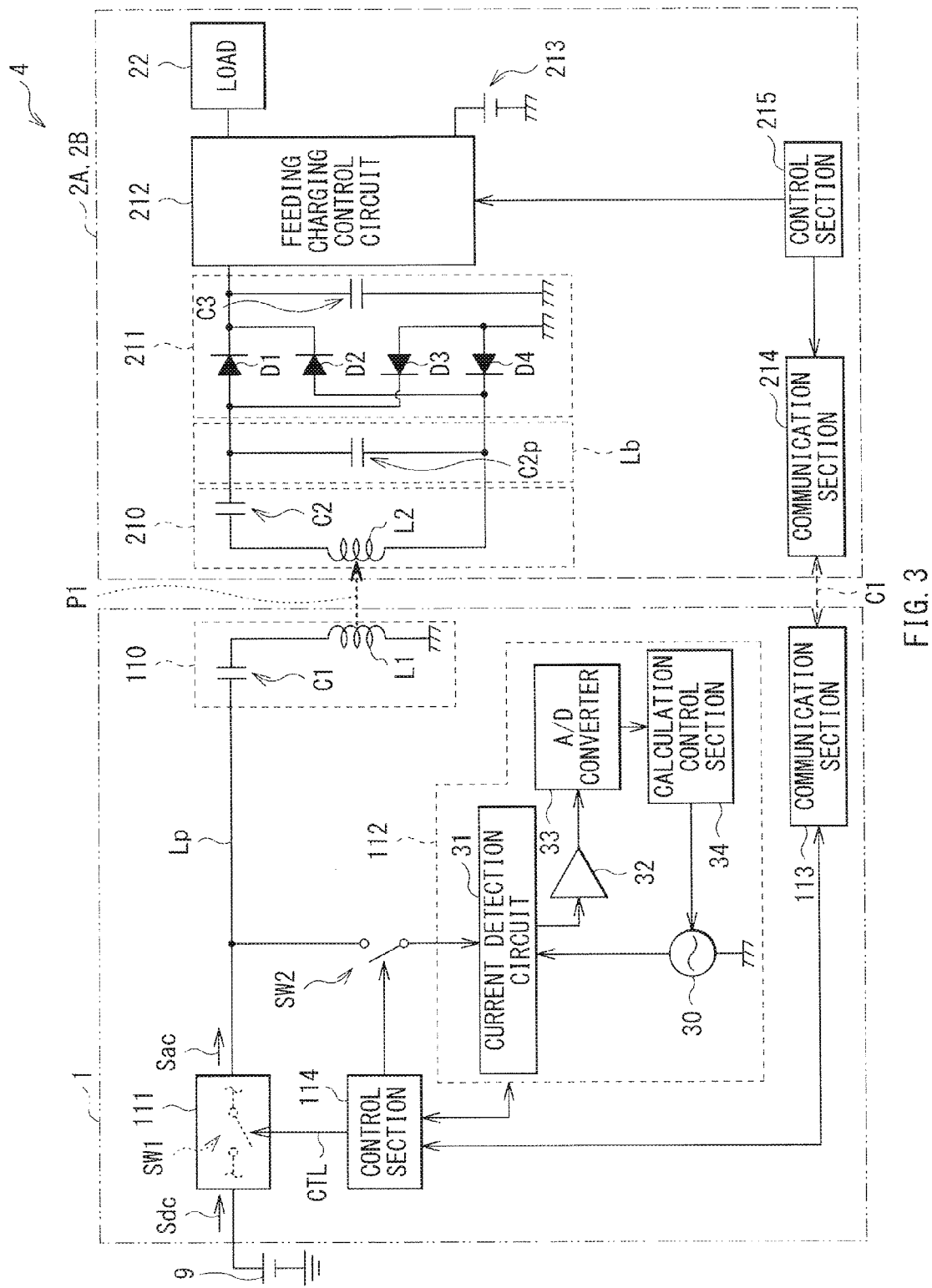
FIG. 3 is a diagram illustrating a detailed configuration example of each block illustrated in FIG. 2.

FIG. 3 illustrates a detailed configuration example of each block in the feed unit 1 and the electronic apparatuses 2A and 2B illustrated in FIG. 2 by way of a circuit diagram and a block diagram.

(Power Transmission Section 110)

The power transmission section 110 includes the power transmission coil L1 to perform power transmission using a magnetic field (to generate a magnetic flux), and the capacitor C1 to form, together with the power transmission coil L1, the above-described LC resonance circuit. The power transmission coil L1 and the capacitor C1 are electrically connected in series to each other. Specifically, a first end of the power transmission coil L1 is connected to a first end of the capacitor C1, a second end of the power transmission coil L1 is grounded, and a second end of the capacitor C1 is connected to an output terminal of the AC signal generation circuit 111 through a power supply line Lp.

Moreover, the LC resonance circuit formed in the power transmission section 110 and the LC resonance circuit formed in the power reception section 210 and the like that will be described later are magnetically coupled with each other (mutual induction). As a result, LC resonance operation at a resonance frequency that is substantially the same as that of the high-frequency power (the AC signal Sac) generated by the AC signal generation circuit 111 is performed.

(AC Signal Generation Circuit 111)

The AC signal generation circuit 111 is configured using a switching amplifier (not illustrated, so-called class-D amplifier, class-E amplifier, or the like) that includes one or a plurality of switching elements SW1 each configured of a metal oxide semiconductor (MOS) transistor or the like. The AC signal generation circuit 111 is supplied with the control signal CTL for power transmission from the control section 114. The control signal CTL is formed of a pulse signal representing a predetermined frequency f (CTL(f)=f1) and a duty radio Duty (CTL(Duty)=10%, 50%, etc.).

With such a configuration, in the AC signal generation circuit 111, the above-described switching elements SW1 each perform ON-OFF operation (switching operation by the above-described frequency f and the above-described duty ratio Duty), according to the control signal CTL for power transmission. In other words, the ON-OFF operation of the respective switching elements SW1 is controlled using the control signal CTL supplied from the control section 114. As a result, the AC signal Sac is generated, for example, based on the DC signal Sdc input from the external power source 9 side, and is supplied to the power transmission section 110.

(Coupling Coefficient Calculation Circuit 112)

The coupling coefficient calculation circuit 112 is disposed so as to be connectable to the power supply line Lp through the switching element SW2, and has a function of calculating the coupling coefficient between the power transmission coil L1 and the power reception coil L2 as described above. Note that the switching element SW2 is set so as to be turned on at the time of calculating the coupling coefficient in response to the control by the control section 114.

The coupling coefficient calculation circuit 112 measures frequency characteristics of input impedance Zin viewed from the feed unit 1 side in a non-operating state of the rectification circuit 211 in each of the electronic apparatuses 2A and 2B, and uses the measurement result of the frequency characteristics to calculate the coupling coefficient k. More specifically, the coupling coefficient calculation circuit 112 detects frequencies f at extreme values of the input impedance Zin from the measurement result of the frequency characteristics, and uses the frequencies f at the extreme values to calculate the coupling coefficient k.

In particular, in the first embodiment, although the detail will be described later, the coupling coefficient calculation circuit 112 detects both a frequency (a frequency $f_H$ described later) at a minimum value and a frequency (a frequency $f_L$ described later) at a maximum value as the frequencies at the extreme values, and calculates the coupling coefficient k with use of both the frequencies $f_H$ and $f_L$. Moreover, in the first embodiment, the coupling coefficient calculation circuit 112 measures the frequency characteristics of the input impedance Zin with use of a weak signal (a measurement signal weak in measurement power), to measure the frequency characteristics in the above-described non-operating state of the rectification circuit 211.

As illustrated in FIG. 3, the coupling coefficient calculation circuit 112 includes a measurement signal generation section 30, a current detection circuit 31 (a current detection section), an amplifier 32, an A/D converter 33, and a calculation control section 34. Note that the calculation control section 34 corresponds to specific examples of "calculation section" and "control section".

The measurement signal generation section 30 generates a measurement signal to measure the frequency characteristics of the input impedance Zin, and in this example, is configured using an AC power source. The measurement signal has a predetermined voltage V and a frequency f, and is supplied from the power supply line Lp to the power transmission section 110 through the switching element SW2.

The current detection circuit 31 detects a current I (a measurement current) that flows through the power transmission coil L1 in measuring the frequency characteristics of the input impedance Zin. The value (in this example, an analog value) of the current I detected in such a way is supplied to the amplifier 32. Such a current detection circuit 31 may be configured using, for example, a resistor or a current transformer.

The amplifier 32 is a circuit (an amplifier circuit) having a function of amplifying the value (the signal) of the current I detected by the current detection circuit 31.

The A/D converter 33 performs A/D (analog/digital) conversion on the current I of the analog value output from the amplifier 32, and outputs the current I of a digital value.

The calculation control section 34 has a function of controlling operation of the measurement signal generation section 30 to control the voltage V and the frequency f of the measurement signal. In addition, the calculation control section 34 has a function of calculating the input impedance Zin (Zin=V/I) based on the current I detected by the current detection circuit 31 and the voltage V of the measurement signal set by the calculation control section 34 itself. At this time, continuously varying the frequency f of the measurement signal (sweeping the value of the frequency f) allows the frequency characteristics of the input impedance Zin to be obtained. Note that the detail of the control function and the calculation function of the calculation control section 34 will be described later.

(Power Reception Section 210 and Bypass Route Lb)

The power reception section 210 includes the power reception coil L2 to receive power (from an AC magnetic field) transmitted from the power transmission section 110, and the capacitor C2 to form, together with the power reception coil L2, the above-described LC resonance circuit. The power reception coil L2 and the capacitor C2 are electrically connected in series to each other, and the above-described capacitor C2p is electrically connected in parallel to the power reception section 210. Specifically, a first end of the capacitor C2 is connected to a first input terminal of the rectification circuit 211 and a first end of the capacitor C2p, and a second end of the capacitor C2 is connected to a first end of the power reception coil L2. In addition, a second end of the power reception coil L2 is connected to a second input terminal of the rectification circuit 211 and a second end of the capacitor C2p.

In this case, the LC resonance circuit configured of the power reception coil L2 and the capacitors C2 and C2p and the above-described LC resonance circuit configured of the power transmission coil L1 and the capacitor C1 are magnetically coupled with each other. Accordingly, LC resonance operation at a resonance frequency that is substantially the same as that of the high-frequency power (the AC signal Sac) generated by the AC signal generation circuit 111 is performed.

In addition, as illustrated in FIG. 3, a route (a bypass route Lb) provided with the capacitor C2p is electrically connected in parallel to the power reception section 210, and is provided between the pair of input terminals of the rectification circuit 211. The bypass route Lb functions as a bypass route with respect to the rectification circuit 211. Although the detail will be described later, this allows the rectification circuit 211 to be in the non-operating state (an invalid state, or an inactive state) at the time of measurement of the frequency characteristics of the input impedance Zin.

(Rectification Circuit 211)

The rectification circuit 211 is configured using four rectification elements (diodes) D1 to D4 and a smoothing capacitor C3 in this example. In the example of FIG. 3, an anode of the rectification element D1 and a cathode of the rectification element D3 are connected to the first input terminal of the rectification circuit 221, and a cathode of the rectification element D1 and a cathode of the rectification element D2 are connected to an output terminal of the rectification circuit 221. Moreover, an anode of the rectification element D2 and a cathode of the rectification element D4 are connected to the second input terminal of the rectification circuit 211, and an anode of the rectification element D3 and an anode of the rectification element D4 are grounded. In other words, the rectification circuit 211 is a circuit having a so-called diode bridge structure. Moreover, the capacitor C3 is disposed between the ground and a route between a connection point of cathodes of the respective rectification elements D1 and D2 and the feeding charging control circuit 212. With this configuration, the rectification circuit 211 rectifies the AC power supplied from the power reception section 210, smoothes the rectified power to reduce pulsation, and supplies the received power of the DC power to the feeding charging control circuit 212. Note that the rectification circuit 211 may be a synchronous rectification circuit using a transistor.

(Function and Effects of Feed System 4)
(Outline of General Operation)

In the feed system 4, the AC signal generation circuit 111 in the feed unit 1 supplies predetermined high-frequency power (the AC signal Sac) for power transmission, to the power transmission coil L1 and the capacitor C1 in the power transmission section 110, based on the power supplied from the external power source 9. Accordingly, a magnetic field (a magnetic flux) is generated in the power transmission coil L1 in the power transmission section 110. At this time, when the electronic apparatuses 2A and 2B as units to be fed with power are placed (or closely disposed) on a top surface (the feeding surface S1) of the feed unit 1, the power transmission coil L1 in the feed unit 1 and the power reception coil L2 in each of the electronic apparatuses 2A and 2B are brought close to each other near the feeding surface S1.

In this way, when the power reception coil L2 is disposed near the power transmission coil L1 generating the magnetic field, electromotive force (induced electromotive force) is generated in the power reception coil L2 by induction of the magnetic flux generated from the power transmission coil L1. In other words, interlinkage magnetic field is generated in each of the power transmission coil L1 and the power reception coil L2 by electromagnetic induction or magnetic-field resonance. As a result, power is transmitted from the power transmission coil L1 side (a primary side, the feed unit 1 side, the power transmission section 110 side) to the power reception coil L2 side (a secondary side, the electronic apparatuses 2A and 2B side, the power reception section 210 side) (see the arrow P1 in FIG. 2 and FIG. 3). At this time, the power transmission coil L1 on the feed unit 1 side and the power reception coil L2 on the electronic apparatuses 2A and 2B side are magnetically coupled with each other by the electromagnetic induction or the like, and thus the LC resonance operation is performed.

Then, in the electronic apparatuses 2A and 2B, the AC power received by the power reception coil L2 is supplied to the feeding charging control circuit 212 through the rectification circuit 211, thereby leading to the following charging operation. Specifically, after the AC power is converted into predetermined DC power by the rectification circuit 211, charging to the battery 213 based on the DC power is performed by the feeding charging control circuit 212. In this way, in the electronic apparatuses 2A and 2B, the charging operation based on the power received by the power reception section 210 is performed.

In other words, in the first embodiment, terminal connection to an AC adopter or the like is unnecessary for charging of the electronic apparatuses 2A and 2B, and charging is easily started (non-contact feeding is performed) only by placing (closely disposing) the electronic apparatuses 2A and 2B on the feeding surface S1 of the feed unit 1. This leads to liability relief of a user.

In addition, in such operation, mutual communication operation is performed between the communication section 113 in the feed unit 1 and the communication section 214 in each of the electronic apparatuses 2A and 2B (see the arrow C1 in FIG. 2 and FIG. 3). As a result, for example, mutual authentication between units, feed efficiency control, and the like may be performed.

(Function of Coupling Coefficient Calculation Circuit 112)

Incidentally, as described above, such a non-contact feed system is roughly classified into an electromagnetic induction system and a magnetic resonance system. A large difference between the two systems is generally a coupling coefficient between the power transmission coil and the power reception coil. More specifically, a high coupling coefficient is necessary in the electromagnetic induction system. Therefore, it is necessary to provide a primary-side unit and a secondary-side unit so as to be close to each other. On the other hand, in the magnetic resonance system, feeding with high efficiency is possible even when the coupling coefficient is small. Therefore, the primary-side unit and the secondary-side unit are allowed to be disposed separately from each other.

The coupling coefficient is an extremely important parameter because the coupling coefficient largely affects the power transmission property of the non-contact feed system. For example, properly setting the parameters such as power transmission amplitude and power transmission frequency according to the value of the coupling coefficient may enable stabilization of power feeding. In the non-contact feed system, some methods to obtain the coupling coefficient are considered. For example, a method in which the power reception coil is controlled to be two patterns, a short-circuit state and an open state, and inductance value of the power transmission coil in each state is measured to obtain the coupling coefficient may be used. In addition, a method in which a coupling coefficient is estimated from a distance between the primary-side unit and the secondary-side unit, measured by a distance sensor may be considered.

At this time, for example, in the case where the non-contact feeding is performed on a mobile device, the secondary-side unit may be desirably operated even in a no-power state (a coupling coefficient is allowed to be obtained) in consideration of the case where the battery in the secondary-side unit is empty. By the above-described methods, however, dynamic control to the secondary-side unit (a unit to be fed with power) is necessary to obtain the coupling coefficient, and the coupling coefficient is not allowed to be obtained when the secondary-side unit is in the no-power state. In other words, disadvantageously, dynamic control is performed on the secondary-side unit, which is a complicated method. Further, an additional sensor such as a distance sensor is necessary, which may cause issues in terms of size and cost.

Therefore, in the feed system 4 according to the first embodiment, the coupling coefficient calculation circuit 112 having a configuration illustrated in FIG. 2 and FIG. 3 is provided, and the coupling coefficient k is calculated by the following method. The method will be described in detail below.

Figure 4:
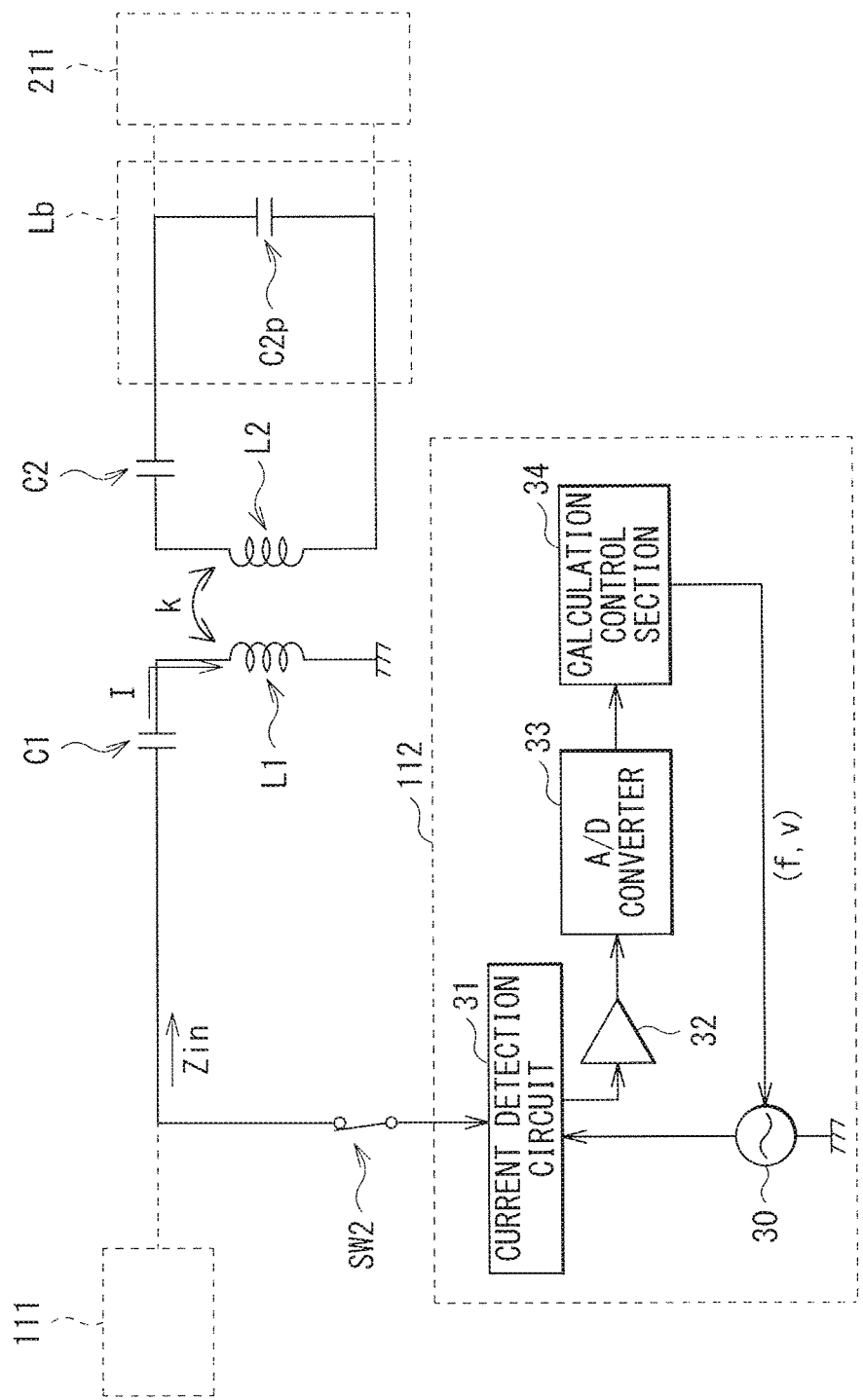
FIG. 4 is a circuit diagram for explaining a method of calculating a coupling coefficient in a circuit illustrated in FIG. 3.

First, for example, as illustrated by a dashed line in FIG. 4, the feed system 4 is configured so that the rectification circuit 211 in each of the electronic apparatuses 2A and 2B as units to be fed with power is automatically put into the non-operating state (without dynamic control) during the calculation of the coupling coefficient k (during the measurement of the frequency characteristics of the input impedance Zin described later). More specifically, as illustrated in FIG. 3 and FIG. 4, the bypass route Lb with respect to the rectification circuit 211 is previously provided in each of the electronic apparatuses 2A and 2B, and the capacitor C2$p$ is disposed on the bypass route Lb. Further, during the measurement of the frequency characteristics of the input impedance Zin, a weak signal for measurement (a measurement signal weak in measurement power) flows through the bypass route Lb, and thus the rectification circuit 211 is put into the non-operating state by itself. This is because the rectification circuit 211 does not work with respect to such a weak signal, and is put into a state substantially equivalent to the non-connected state.

Moreover, as illustrated by a dashed line in FIG. 4 similarly, the AC signal generation circuit 111 is also set so as to be in the non-operating state during the measurement of the frequency characteristics of the input impedance Zin, in addition to the rectification circuit 211 in each of the electronic apparatuses 2A and 2B. More specifically, since this is the setting inside the feed unit 1, the control section 114 dynamically turns off the switching element SW1, or the like, to stop the function of the AC signal generation circuit 111, in that case. Thus, the AC signal generation circuit 111 is put into the non-operating state. In other words, similarly to the above-described rectification circuit 211, the AC signal generation circuit 111 is also put into a state substantially equivalent to a non-connected state.

In this example, in the case where the rectification circuit 211 and the AC signal generation circuit 111 are each set to be the non-operating state, the input impedance Zin viewed from the feed unit 1 is represented by the following expressions (1) to (4).

[Numerical Expressions 1]

$$Zin = j\omega L1 \left[ \left\{ 1 - \left(\frac{f1}{f}\right)^2 \right\} - \frac{k^2}{1 - \left(\frac{f2}{f}\right)^2} \right] \quad (1)$$

$$f1 = \frac{1}{2\pi\sqrt{L1C1}} \quad (2)$$

$$f2 = \frac{1}{2\pi\sqrt{L2C2'}} \quad (3)$$

$$C2' = \frac{1}{\frac{1}{C2} + \frac{1}{C2p}} \quad (4)$$

where L1 is the inductance of the power transmission coil L1, L2 is the inductance of the power reception coil L2, C1 is a capacitance of the capacitor C1, C2 is a capacitance of the capacitor C2, C2p is a capacitance of the capacitor C2p, CT is a combined capacitance of the capacitors C2 and C2p, f1 is a resonance frequency of the LC resonance circuit configured of the power transmission coil L1 and the capacitor C1, f2 is a resonance frequency of the LC resonance circuit configured of the power reception coil L2 and the capacitors C2 and C2p, f is a frequency during the measurement (a frequency of a measurement signal, a variable value), and k is the coupling coefficient between the power transmission coil L1 and the power reception coil L2.

Figure 5:
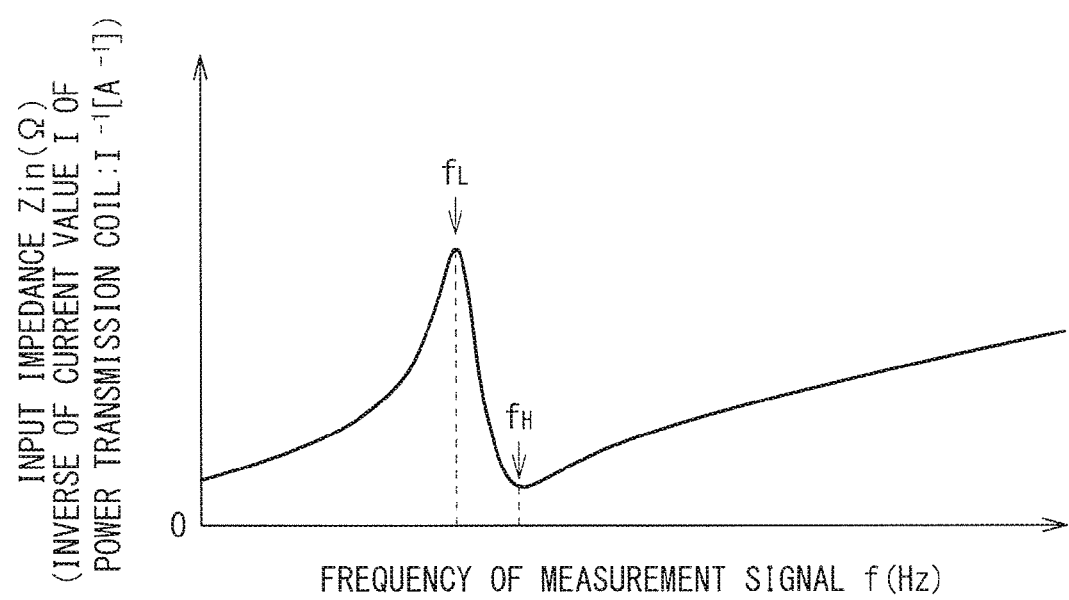
FIG. 5 is a characteristic diagram for explaining a frequency at a minimum value of input impedance and a frequency at a maximum value thereof used in the method of calculating the coupling coefficient according to the first embodiment.

Moreover, when the capacitance of the capacitor C2p is set so that the condition (f1<<f2) is satisfied between the above-described two resonance frequencies f1 and f2, the frequency characteristics of the input impedance Zin may be, for example, as illustrated in FIG. 5. In other words, when the frequency f of the measurement signal is varied, the input impedance Zin has two extreme values. More specifically, in the first embodiment, the input impedance Zin shows a maximum value at the frequency $f_L$, and shows a minimum value at the frequency $f_H$. Note that, for example, when the capacitor C1 is not provided in the power transmission section 110 and the first end of the power transmission coil L1 and the power supply line Lp are short-circuited, the capacitor C1 is considered to approach infinity (f1=0). Therefore, the same applies to this case.

In this example, the frequency $f_L$ at the maximum value and the frequency $f_H$ at the minimum value are represented by the following expressions (5) and (6), respectively.

[Numerical Expression 2]

$$f_L = f2 \quad (5)$$

$$f_H = \frac{f}{\sqrt{1-k^2}} \quad (6)$$

Therefore, the frequency characteristics of the input impedance Zin are measured by the coupling coefficient calculation circuit 112 and the value of the frequency $f_L$ at the maximum value and the value of the frequency $f_H$ at the minimum value are detected from the measurement result, and thus the coupling coefficient k is obtainable with use of the following expression (7) that is based on the above-described expressions (5) and (6).

[Numerical Expression 3]

$$k = \sqrt{1 - \left(\frac{f_L}{f_H}\right)^2} \quad (7)$$

Figure 6:
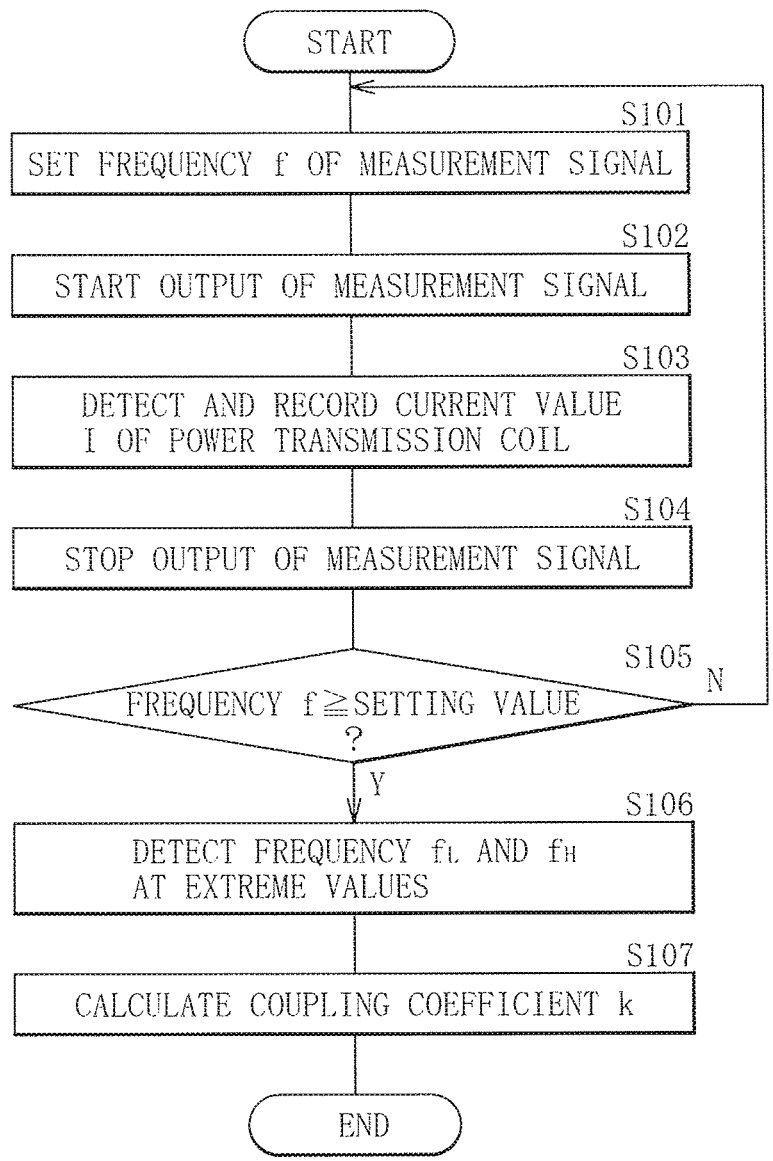
FIG. 6 is a flowchart illustrating an example of operation of calculating the coupling coefficient according to the first embodiment.

In this example, FIG. 6 is a flowchart illustrating an example of the operation of calculating the coupling coefficient k by the coupling coefficient calculation circuit 112. The operation of calculating the coupling coefficient k is described in detail below along FIG. 6.

First, the calculation control section 34 sets the frequency f of the measurement signal (step S101 in FIG. 6). Then, the calculation control section 34 controls the operation of the measurement signal generation section 30 to start output of the measurement signal to the power transmission coil L1 side through the switching element SW2 and the power supply line Lp (step S102).

Next, the current detection circuit 31 detects the current I that flows through the power transmission coil L1 at this time, and the calculation control section 34 records the value of the current I that is input through the amplifier 32 and the A/D converter 33 (step S103). After that, the calculation control section 34 controls the operation of the measurement signal generation section 30 to stop the output of the measurement signal (step S104).

Subsequently, the calculation control section 34 determines whether the currently set value of the frequency f of the measurement signal is equal to or larger than a predetermined setting value (f setting value) that is previously set (step S105). In other words, the calculation control section 34 determines whether the measurement of the frequency characteristics that is performed by continuously varying the frequency f has been completed. At this time, when it is determined that the value of the frequency f is smaller than the above-described setting value (f<setting value) (step S105: N), namely, when it is determined that the measurement of the frequency characteristics has not been completed, the process returns to the step S101 again. Then, the value of the frequency is varied, and the operation at steps S102 to S104 is performed again.

On the other hand, when it is determined that the value of the frequency f is equal to or larger than the above-described setting value (f≥the setting value) (step S105: Y), namely, when it is determined that the measurement of the frequency characteristics has been completed, the calculation control section 34 then detects the frequencies $f_L$ and $f_H$ at the two extreme values by the above-described method (step S106). More specifically, the calculation control section 34 detects the frequency $f_L$ at the maximum value and the frequency $f_H$ at the minimum value from the measurement result of the frequency characteristics of the input impedance Zin. At this time, the calculation control section 34 calculates the value of the input impedance Zin with use of a relational expression of Zin=(V/I) (Ohm's law) based on the actually detected value of the current I and the value of the voltage V of the measurement signal.

Then, the calculation control section 34 uses the detected values of the frequencies $f_1$ and $f_H$ to calculate the coupling coefficient k from the above-described expression (7) (step S107). In this way, the operation of calculating the coupling coefficient k illustrated in FIG. 6 is ended.

As described above, in the first embodiment, the frequency characteristics of the input impedance Zin in the non-operating state of the rectification circuit 212 in each of the electronic apparatuses 2A and 2B as units to be fed with power are measured, and the coupling coefficient k between the power transmission coil L1 and the power reception coil L2 is calculated with use of the measurement result of the frequency characteristics. Therefore, as described above, the coupling coefficient k is allowed to be obtained without using, for example, a complicated method in which dynamic control is performed on the units to be fed with power.

Examples 1 and 2

Specific Examples (Examples 1 and 2) according to the first embodiment are described below in comparison with a comparative example. A condition in each of the Examples 1 and 2 and the comparative example is described below.

Example 1

Measurement power (power of measurement signal): −20 dBm
Displacement between primary-side unit and secondary-side unit: absence (0 mm), presence (10 mm)

Example 2

Measurement power: −10 dBm
Displacement: absence (0 mm), presence (10 mm)

Comparative Example

Method in which a power reception coil is controlled to be in two patterns, a short circuit state and an open state, and a coupling coefficient is obtained from inductance ratio viewed from a power transmission coil in each state (common method)

Note that the measurement was performed by using a circuit having a diode bridge structure as the rectification circuit 212, using a network analyzer in the measurement of the input impedance Zin, and setting the measurement power to the above-described value.

Figure 7:
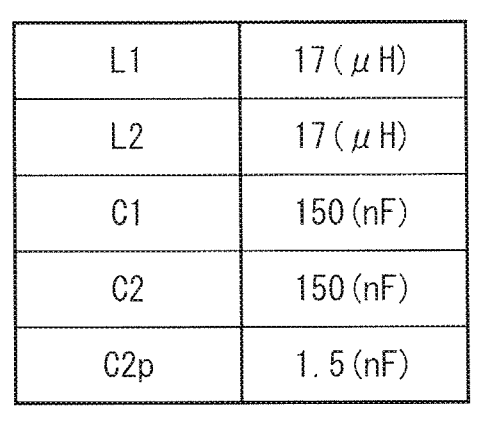

In addition, the value of the inductance of each coil and the value of the capacitance of each capacitor were set as illustrated in FIG. 7. At this time, the capacitance value of the capacitor C1 was set to allow the above-described resonance frequency f1 to be about 100 kHz. In addition, the capacitance value of the capacitor C2 was also set to allow the resonance frequency of the LC resonance circuit that is configured of the capacitor C2 and the power reception coil L2, to be about 100 kHz. Further, the capacitance value of the capacitor C2p was set to allow the above-described resonance frequency f2 to be about 1 MHz (>>f1) in the case where the rectification circuit 212 is assumed to be in non-connected (non-operating) state.

Figure 8A:
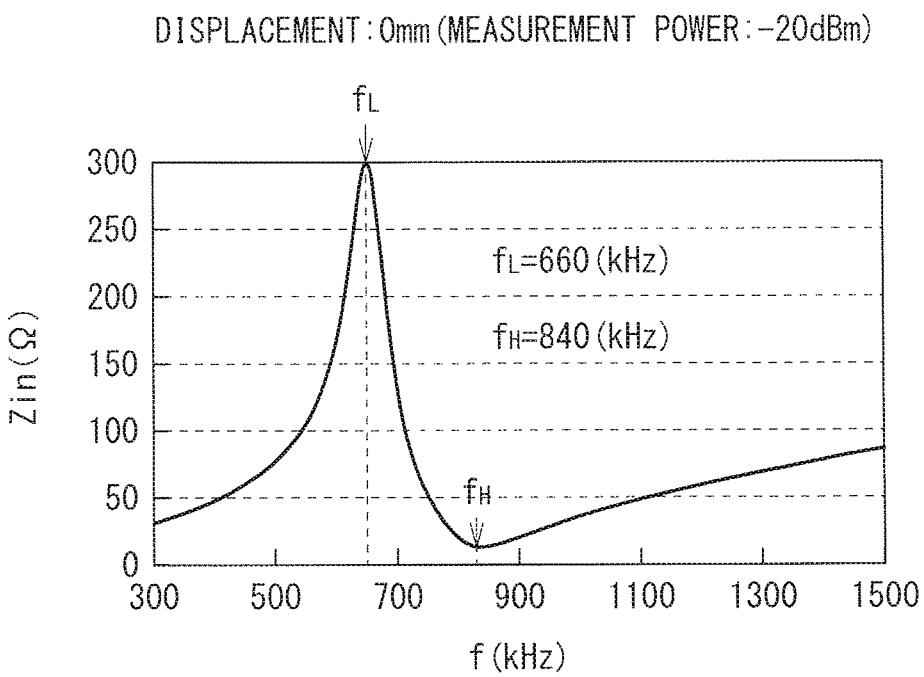
FIG. 8A is a characteristic diagram illustrating an example of frequency characteristics of input impedance according to the Example 1.
Figure 8B:
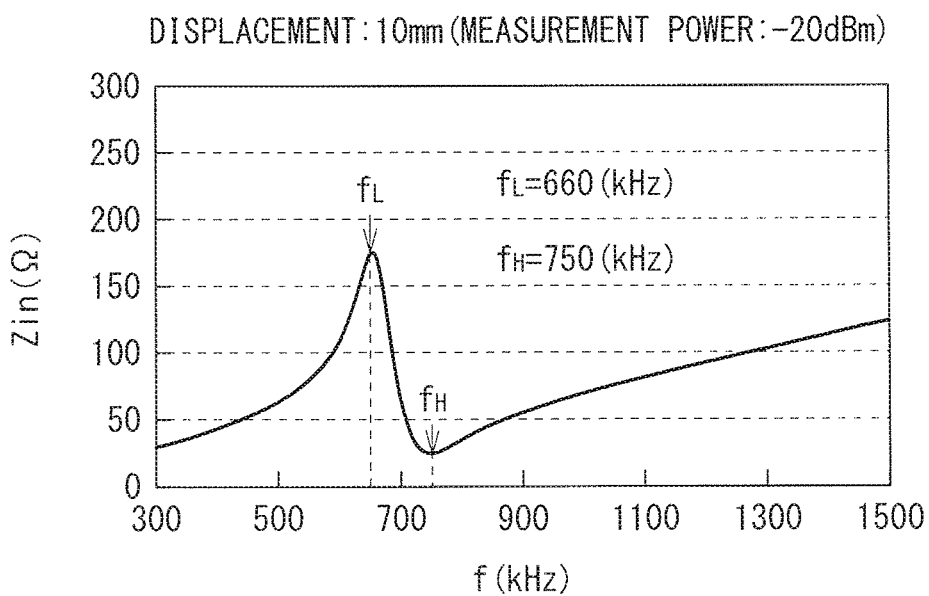
FIG. 8B is a characteristic diagram illustrating another example of the frequency characteristics of the input impedance according to the Example 1.

In this example, FIG. 8A and FIG. 8B illustrate the measurement result of the frequency characteristics of the input impedance Zin in the case where the displacement is absent and in the case where the displacement is present in the Example 1, respectively. Moreover, Table 1 illustrates the values of the coupling coefficient k obtained in the Example 1 and the comparative example in the case where the displacement is absent and in the case where the displacement is present.

It is found from the Table 1 that the value of the coupling coefficient k obtained in the Example 1 is substantially equal to the value of the coupling coefficient k obtained in the comparative example (the common method), and is obtained with high accuracy both in the case where the displacement is absent and in the case where the displacement is present. Incidentally, in the Example 1, although the capacitance value of the capacitor C2p is set to allow the frequency $f_L$ to be about 1 MHz in calculation, the obtained value is lower than the calculated value due to influence of parasitic capacitance component in the rectification circuit 212.

TABLE 1

| | Example 1 | Comparative Example |
|---|---|---|
| Displacement: 0 mm | 0.62 | 0.61 |
| Displacement: 10 mm | 0.47 | 0.42 |

Figure 9A:
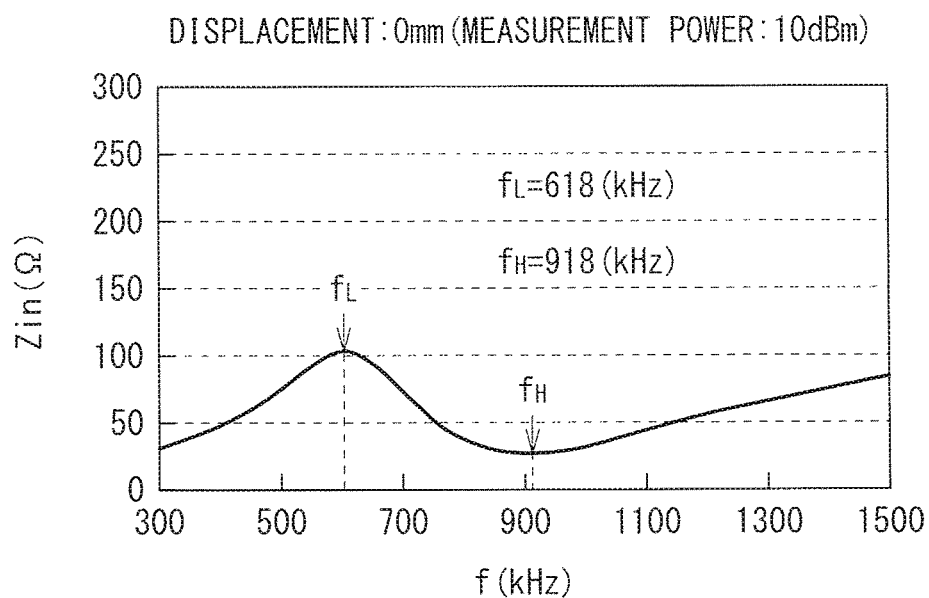
FIG. 9A is a characteristic diagram illustrating an example of frequency characteristics of input impedance according to the Example 2.
Figure 9B:
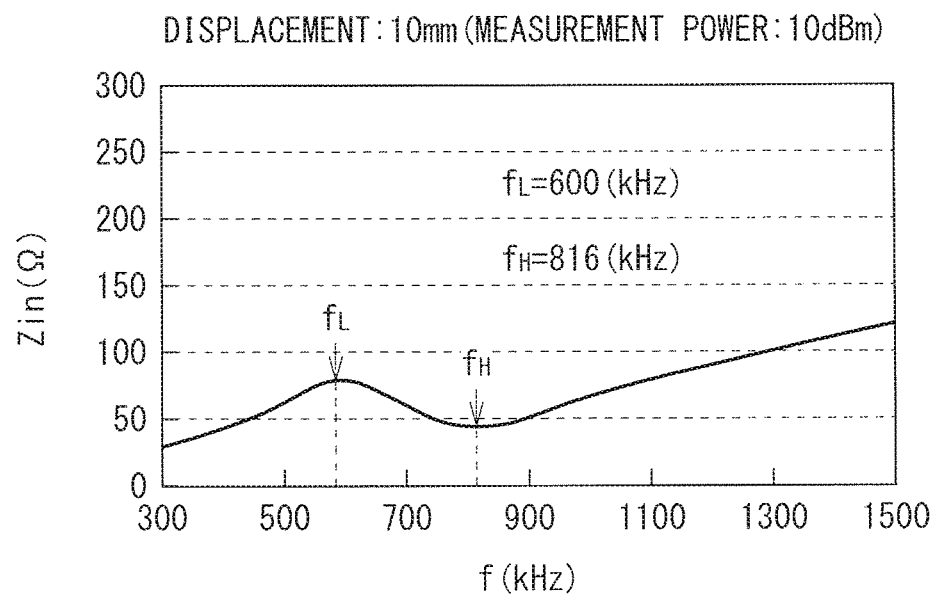
FIG. 9B is a characteristic diagram illustrating another example of the frequency characteristics of the input impedance according to the Example 2.

Moreover, FIG. 9A and FIG. 9B illustrate the measurement result of the frequency characteristics of the input impedance Zin in the case where the displacement is absent and in the case where the displacement is present in the Example 2, respectively. In the Example 2, it is found that the extreme values (a peak and a valley) of the input impedance Zin are made gentle due to influence that the measurement power is larger than that in the Example 1 and thus the measurement signal gradually become a signal that is not considered as a weak signal (the rectification circuit 212 is not considered in the non-operating state). In addition, it is found that the values of the frequencies $f_L$ and $f_H$ at the extreme values are slightly different from those in the Example 1. Accordingly, it is desirable to measure the frequency characteristics of the input impedance Zin under the condition that the measurement power is suppressed low to a certain extent and the measurement signal is considered as a weak signal.

As described above, in the first embodiment, the coupling coefficient k is calculated using the measurement result of the frequency characteristics of the input impedance Zin in the non-operating state of the rectification circuit 212. Therefore, it is possible to obtain the coupling coefficient k without using a complicated method. Accordingly, it is possible to easily obtain the coupling coefficient k in power transmission using a magnetic field.

More specifically, the coupling coefficient k is allowed to be obtained by simple control only by the feed unit 1 without separately adding a large sensor or the like. Therefore, it is possible to achieve the feed system 4 small in size at low cost. In addition, since the measurement method is simple, it is possible to obtain the coupling coefficient k in a short measurement time (calculation time).

Further, as compared with the calculation method in a second embodiment that will be described below, the following advantages are obtainable by the calculation method in the first embodiment. Specifically, as described above, since the measurement is performed while the condition (f1<<f2) between the two resonance frequencies f1 and f2 is satisfied, the precondition in the measurement is allowed to be satisfied relatively easily, and the method is made resistant to variation of elements (variation of the capacitance value of the capacitor C2p and the like).

Second Embodiment

Subsequently, the second embodiment of the present disclosure is described. In the above-described first embodiment, an example of the case where the coupling coefficient k is obtained using the frequencies both at the minimum value and the maximum value has been described. In the second embodiment, an example in which the coupling coefficient k is obtained using frequencies at two minimum values is described. Note that like numerals are used to designate substantially like components in the first embodiment, and the description thereof is appropriately omitted.

(Configuration of Feed System 4A)

Figure 10:
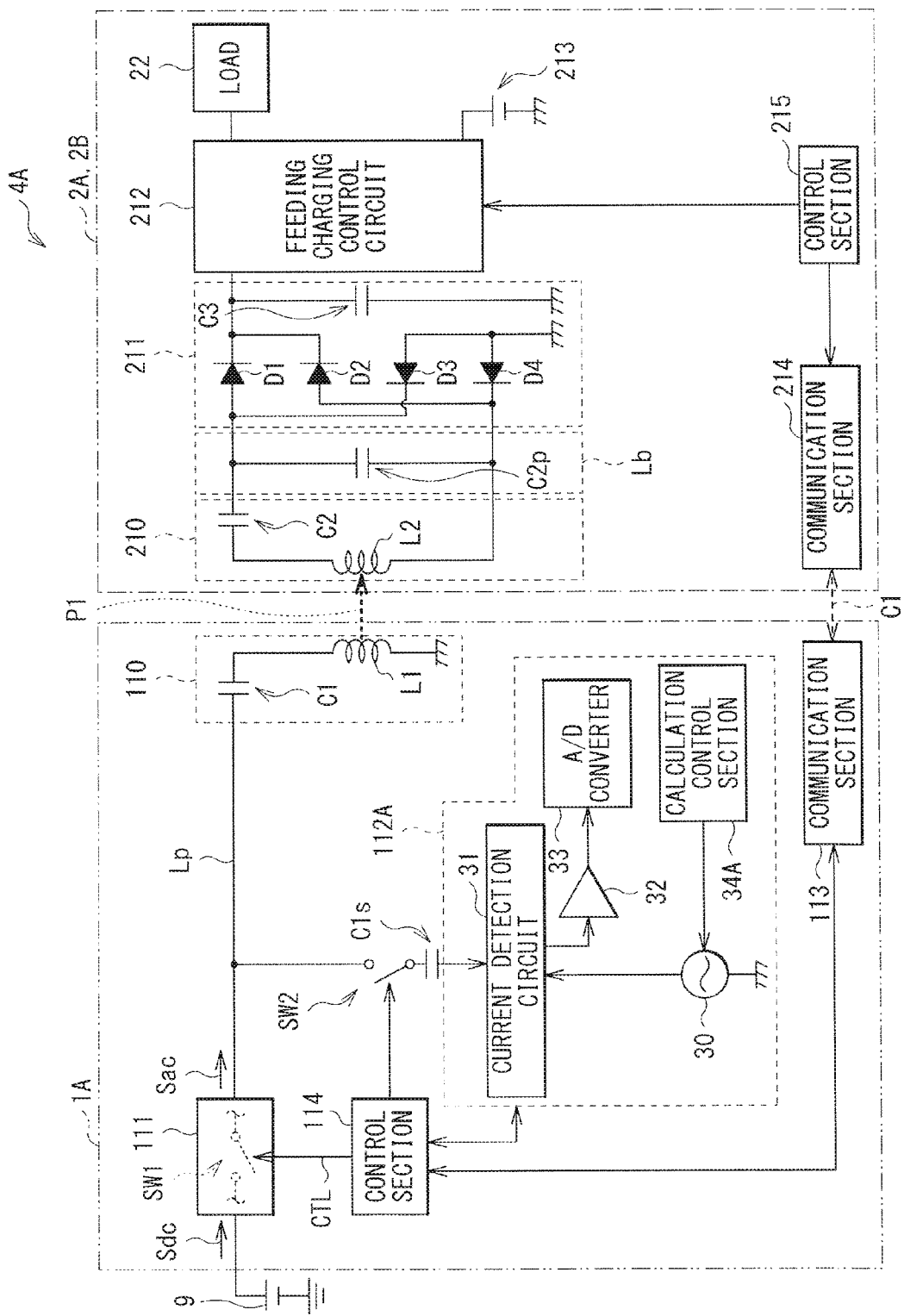
FIG. 10 is a circuit diagram illustrating a configuration example of a feed system according to a second embodiment.

FIG. 10 illustrates a configuration example of a feed system (a feed system 4A) according to the second embodiment of the present disclosure by way of a circuit diagram and a block diagram. The feed system 4A in the second embodiment corresponds to a feed system in which a feed unit 1A described below is provided in place of the feed unit 1 in the feed system 4 of the first embodiment, and the other configurations of the feed system 4A are similar to those of the feed system 4.

(Feed Unit 1A)

The feed unit 1A corresponds to a feed unit in which a capacitor C1s is further provided, and a coupling coefficient calculation circuit 112A (a coupling coefficient calculation section) is provided in place of the coupling coefficient calculation circuit 112 in the feed unit 1. The other configurations of the feed unit 1A are similar to those of the feed unit 1.

The capacitor C1s is disposed on a route between the coupling coefficient calculation circuit 112A and the power supply line Lp (in this example, between the coupling coefficient calculation circuit 112A and the switching element SW2). The capacitor C1s is provided so as to, together with the capacitor C2p, satisfy the condition (f1=f2=f0, where f0 is a predetermined resonance frequency) between the two resonance frequencies f1 and f2 that will be described later.

The coupling coefficient calculation circuit 112A corresponds to a coupling coefficient calculation circuit in which a calculation control section 34A is provided in place of the calculation control section 34 in the coupling coefficient calculation circuit 112 of the first embodiment, and the other configurations of the coupling coefficient calculation circuit 112A are similar to those of the coupling coefficient calculation circuit 112.

As will be described below, the calculation control section 34A basically uses a method similar to that by the calculation control section 34, to calculate the coupling coefficient k. Specifically, the calculation control section 34A measures the frequency characteristics of the input impedance Zin in the non-operating state of the rectification circuit 211 in each of the electronic apparatuses 2A and 2B as units to be fed with power, and uses the measurement result of the frequency characteristics to calculate the coupling coefficient k.

Incidentally, unlike the first embodiment, in the second embodiment, the coupling coefficient k is calculated with use of the frequencies at the two minimum values as described above. The method is described in detail below.

Figure 11:
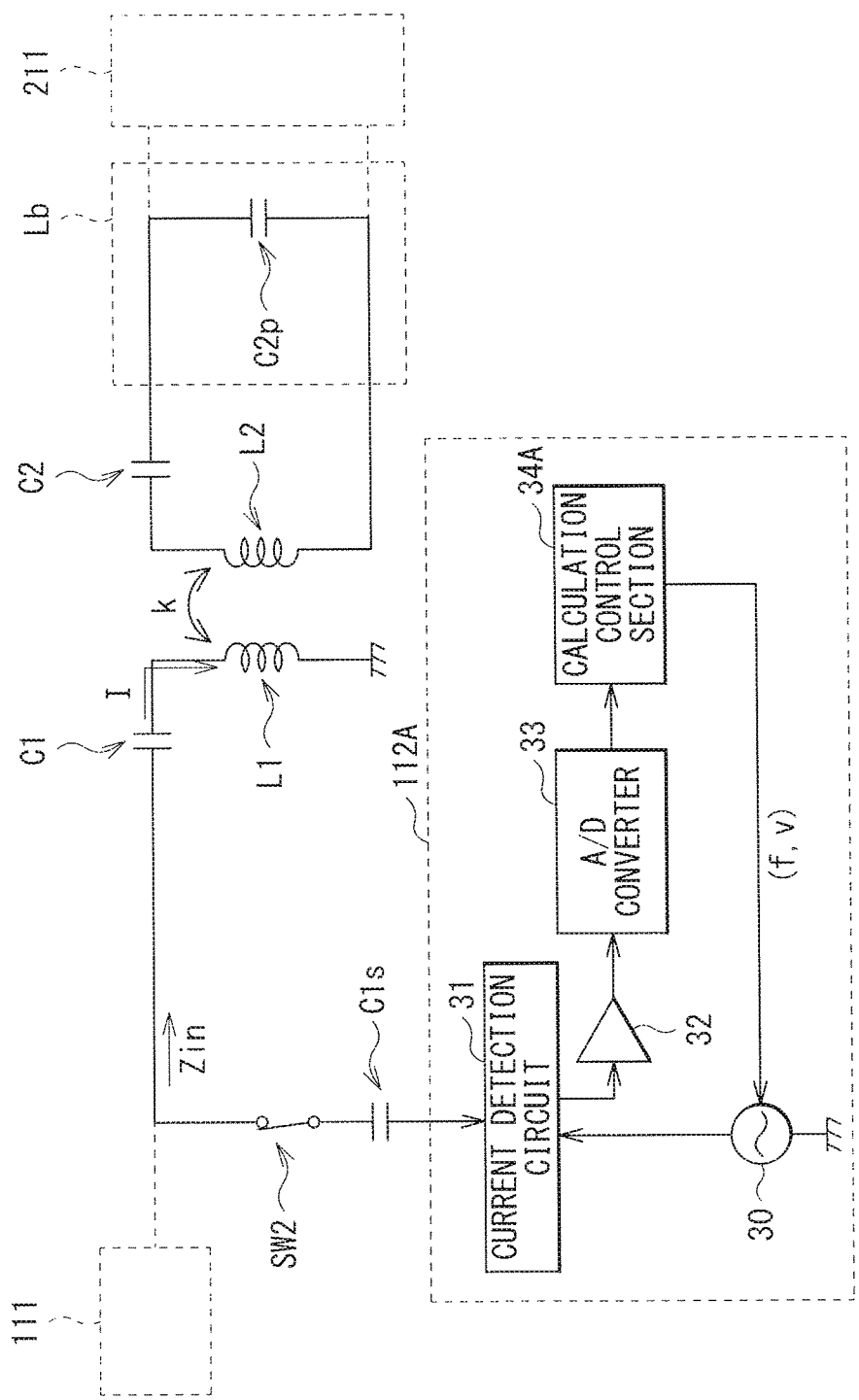
FIG. 11 is a circuit diagram for explaining a method of calculating a coupling coefficient in the circuit illustrated in FIG. 10.

First, for example, as illustrated by a dashed line in FIG. 11, the feed system 4A is configured so that the rectification circuit 211 is automatically put into the non-operating state with use of the bypass route Lb and the measurement signal as the weak signal during the calculation of the coupling coefficient k (during the measurement of the frequency characteristics of the input impedance Zi), also in the second embodiment.

In addition, as also illustrated by a dashed line in FIG. 11, the AC signal generation circuit 111 is also set so as to be put into the non-operating state during the measurement of the frequency characteristics of the input impedance Zin, in the second embodiment, as with the first embodiment.

In this case, when the rectification circuit 211 and the AC signal generation circuit 111 each are set to the non-operating state in this way, in the second embodiment, the input impedance Zin is represented by the following expressions (8) to (12).

[Numerical Expressions 4]

$$Zin = j\omega L1 \left[ \left\{ 1 - \left(\frac{f1}{f}\right)^2 \right\} - \frac{k^2}{1 - \left(\frac{f2}{f}\right)^2} \right] \quad (8)$$

$$f1 = \frac{1}{2\pi\sqrt{L1C1'}} \quad (9)$$

$$f2 = \frac{1}{2\pi\sqrt{L2C2'}} \quad (10)$$

$$C1' = \frac{1}{\frac{1}{C1} + \frac{1}{C1s}} \quad (11)$$

$$C2' = \frac{1}{\frac{1}{C2} + \frac{1}{C2p}} \quad (12)$$

where L1 is the inductance of the power transmission coil L1, L2 is the inductance of the power reception coil L2, C1 is the capacitance of the capacitor C1, C1s is a capacitance of the capacitor C1s, C1' is the combined capacitance of the capacitors C1 and C1s, C2 is the capacitance of the capacitor C2, C2p is the capacitance of the capacitor C2p, C2' is the combined capacitance of the capacitors C2 and C2p, f1 is the resonance frequency of the LC resonance circuit configured of the power transmission coil L1 and the capacitors C1 and C1s, f2 is the resonance frequency of the LC resonance circuit configured of the power reception coil L2 and the capacitors C2 and C2p, f is the frequency during the measurement (a frequency of a measurement signal, a variable value), and k is the coupling coefficient between the power transmission coil L1 and the power reception coil L2.

Figure 12:
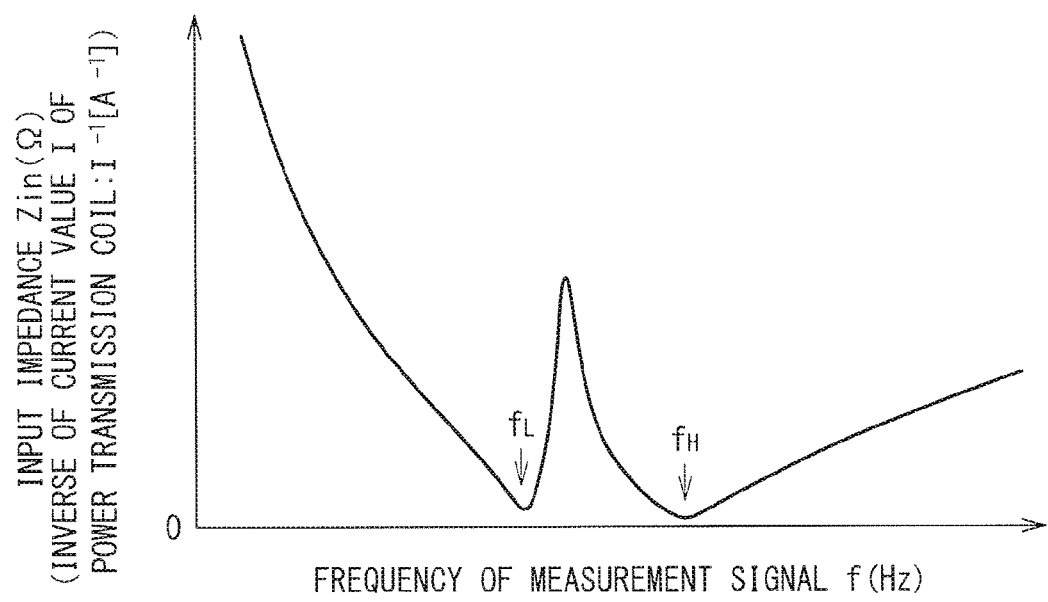
FIG. 12 is a characteristic diagram for explaining frequencies at two minimum values, used in the method of calculating the coupling coefficient according to the second embodiment.

More over, when the capacitances of the capacitors C1s and C2p are set so that the condition (f1=f2=f0) is satisfied between the above-described two resonance frequencies f1 and f2 described above, the frequency characteristics of the input impedance Zin may be as illustrated in FIG. 12, for example. In other words, when the frequency f of the measurement signal is varied, the input impedance Zin has two extreme values. More specifically, in the second embodiment, the input impedance Zin shows a minimum value at both the two frequencies $f_L$ and $f_H$. Note that, in the second embodiment, similarly to the first embodiment, for example, when the capacitor C1 is not provided in the power transmission section 110 and the first end of the power transmission coil L1 and the power supply line Lp are short-circuited, the capacitor C1 is considered to approach infinity (the combined capacitance C1'=the capacitance C1). Therefore, the same applies to this case.

In this example, the frequencies $f_L$ and $f_H$ at such minimum values are represented by the following expressions (13) and (14).

[Numerical Expression 5]

$$f_L = \frac{f_0}{\sqrt{1+k}} \quad (13)$$

$$f_H = \frac{f_0}{\sqrt{1-k}} \quad (14)$$

Therefore, the frequency characteristics of the input impedance Zin are measured by the coupling coefficient calculation circuit 112A and the values of the frequencies $f_L$ and $f_H$ at the respective minimum values are detected from the measurement result, and thus the coupling coefficient k is obtained with use of the following expression (15) that is based on the above-described expressions (13) and (14).

[Numerical Expression 6]

$$k = \frac{f_H^2 - f_L^2}{f_H^2 + f_L^2} \quad (15)$$

As described above, also in the second embodiment, the effects similar to those in the first embodiment are basically obtainable by the function similar to that in the first embodiment. In other words, it is possible to easily obtain the coupling coefficient k in the power transmission using a magnetic field.

In addition, the following advantages are obtainable by the calculation method in the second embodiment, as compared with the above-described calculation method in the first embodiment. Specifically, since it is sufficient to detect the minimum value as the extreme value from the measurement result of the frequency characteristics, the dynamic range in measuring the input impedance Zin is allowed to be small as compared with the case where both the maximum value and the minimum value are detected.

(Modifications 1 and 2)

Subsequently, modifications (modifications 1 and 2) common to the above-described first and second embodiments are described. The modifications 1 and 2 correspond to other examples of the arrangement configuration of the bypass route Lb in each of the electronic apparatuses 2A and 2B. Note that like numerals are used to designate substantially like components in the first and second embodiments, and the description thereof is appropriately omitted.

Figure 13A:
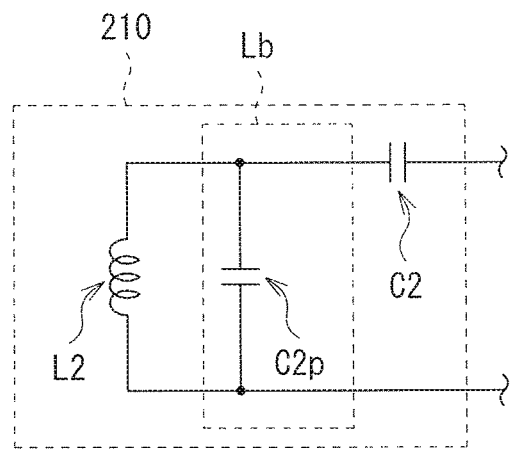
FIG. 13A is a circuit diagram illustrating an arrangement configuration example of a bypass route according to a modification 1.
Figure 13B:
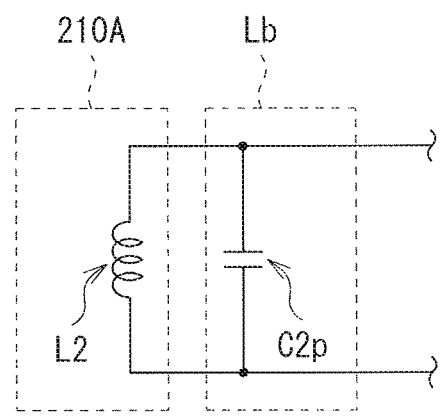
FIG. 13B is a circuit diagram illustrating an arrangement configuration example of a bypass route according to a modification 2.

FIG. 13A is a circuit diagram illustrating an example of the arrangement configuration of the bypass route Lb according to the modification 1, and FIG. 13B is a circuit diagram illustrating an example of the arrangement configuration of the bypass route Lb according to the modification 2.

In the modification 1 illustrated in FIG. 13A, the bypass route Lb is disposed in the power reception section 210. Specifically, the bypass route Lb is disposed between the power reception coil L2 and the capacitor C2.

On the other hand, in the modification 2 illustrated in FIG. 13B, the capacitor C2 is not provided in a power reception section 210A, and the bypass route Lb is disposed between the power reception section 210A and the rectification circuit 211.

As described above, as the arrangement configuration of the bypass route Lb in each of the electronic apparatuses 2A and 2B, various arrangement configurations may be employed as long as the bypass route Lb plays a role of bypass with respect to the rectification circuit 211. Moreover, as for the capacitor C2p on the bypass route Lb, such a capacitor is not actively provided, and parasitic capacitance component may be used instead. In other words, instead of providing the capacitor C2p on the bypass route Lb, for example, a parasitic capacitance component in the rectification circuit 211 may be used to configure, together with the power reception coil L2, the LC resonance circuit. Even with the configuration, similar effects are allowed to be obtained by similar functions to those in the first and second embodiments.

Note that it is necessary for the combined capacitance CT and the resonance frequency f2 in the expressions (1) to (4) and (8) to (12) to be replaced as appropriate, according to the arrangement configuration of the bypass route Lb, presence or absence of the arrangement of the capacitor C2, and the like, for example, as with the modifications 1 and 2. In more generalized expression, the combined capacitance CT is a combined capacitance of a capacitor that configures, together with the power reception coil L2, the LC resonance circuit in the non-operating state of the rectification circuit 211, and the resonance frequency f2 is a resonance frequency of the LC resonance circuit.

Third Embodiment

Subsequently, a third embodiment of the present disclosure is described. In the third embodiment, operation of setting a parameter (a feeding parameter) for the power transmission (power feeding) using the coupling coefficient k that is obtained using the method described in the first or second embodiment described above is described. Note that like numerals are used to designate substantially like components in the first and second embodiments and the like, and the description thereof is appropriately omitted.

The feed system in the third embodiment is basically similar to the feed system 4 in the first embodiment and the feed system 4A in the second embodiment. In this example, as described above, a function of setting the feeding parameter using the coupling coefficient k that is calculated by the coupling coefficient calculation circuit 112 or the coupling coefficient calculation circuit 112A is mainly performed by the control section 114 in the feed unit 1 or 1A. In other words, the control section 114 corresponds to a specific example of "parameter setting section" in the present disclosure.

Figure 14:
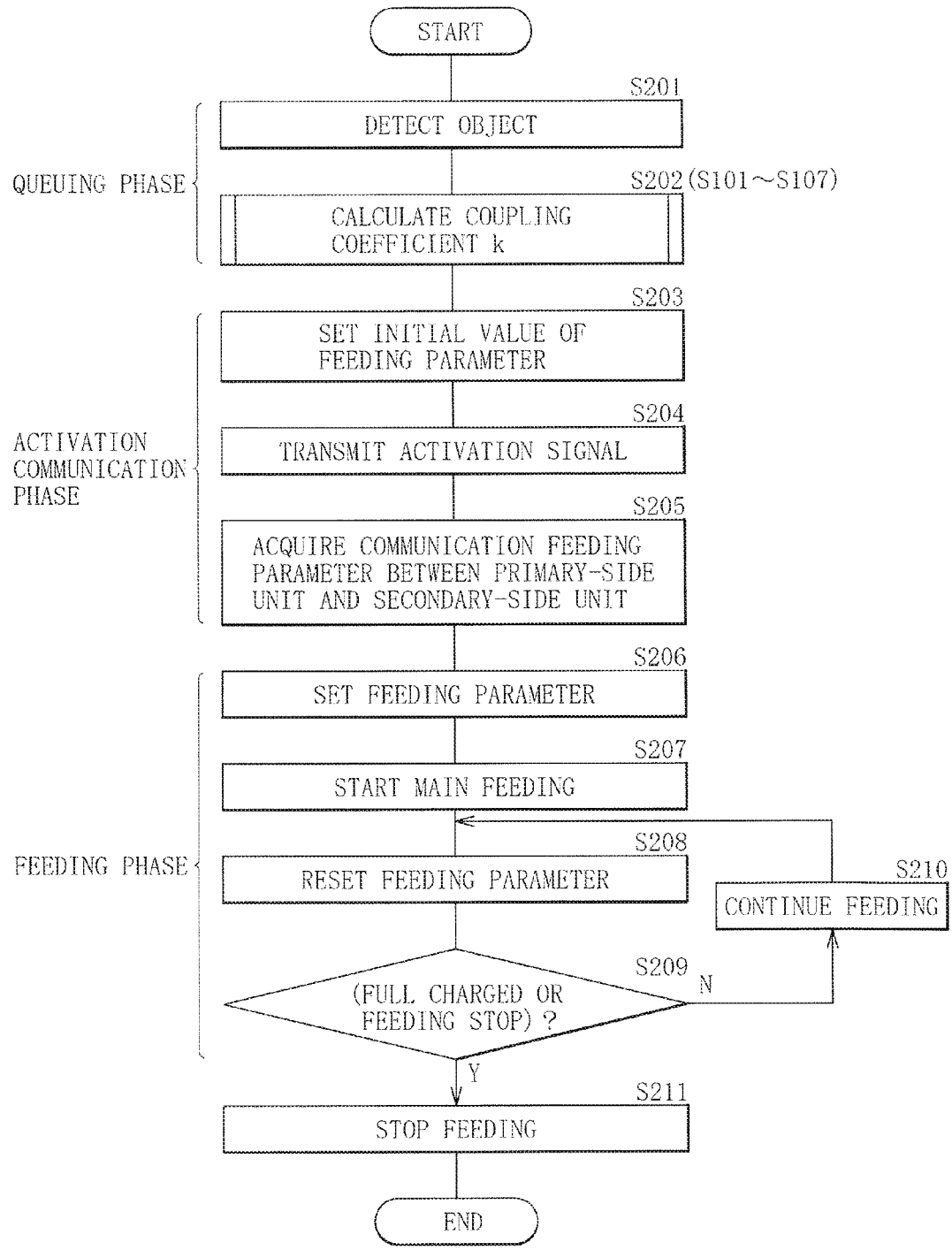
FIG. 14 is a flowchart illustrating an example of operation of setting feed parameters according to a third embodiment.

FIG. 14 is a flowchart illustrating an example of the operation of setting the feeding parameter according to the third embodiment. As illustrated in FIG. 14, the operation of setting the feeding parameter is performed in each of activation communication phase and a feeding phase out of "queuing phase", "activation communication phase", and "feeding phase" in series of feeding operation.

In the series of feeding operation, first, the feed unit 1 or 1A performs object detection (detection whether the unit to be fed with power exists in the vicinity thereof) with use of various methods (step S201 in FIG. 14). Then, the coupling coefficient calculation circuit 112 or 112A uses the method described in the first or the second embodiment (step S101 to S107) to obtain the coupling coefficient k (step S202).

Subsequently, the control section 114 uses the coupling coefficient k thus obtained to set the feeding parameter (initial value of the feeding parameter) for activation of the electronic apparatuses 2A and 2B as units to be fed with power (step S203). After that, an activation signal is transmitted from the power transmission coil L1 to the electronic apparatuses 2A and 2B in response to the control of the control section 114 (step S204).

As described above, in the third embodiment, the coupling coefficient calculation circuits 112 and 112A calculate the coupling coefficient k before activation of the electronic apparatuses 2A and 2B as units to be fed with power. Further, the coupling coefficient calculation circuits 112 and 112A vary the feeding parameter of the activation signal of the electronic apparatuses 2A and 2B according to the magnitude of the obtained coupling coefficient k. More specifically, for example, the voltage of the activation signal is set so as to satisfy an inverse relationship with respect to the coupling coefficient k (the voltage of the activation signal $\propto (1/k)$).

The reason is as follows. First, a predetermined power reception voltage is often necessary to activate the unit to be fed with power. In addition, in the activation phase of the unit to be fed with power, the load 22 is a light load because the load 22 is not connected, and in this case, the power reception voltage is generally proportional to the coupling coefficient k and the voltage of the activation signal (the power reception voltage $\propto$ (k×the voltage of the activation signal)). Therefore, when the unit to be fed with power is placed on the feed unit 1, setting the voltage of the activation signal to be inversely proportional to the obtained coupling coefficient k results in the following advantage. Specifically, irrespective of the position where the unit to be fed with power is placed, and the like, the power reception voltage is substantially constant, which enables stable activation operation in the unit to be fed with power.

Subsequently, when the activation signal is transmitted and the electronic apparatuses 2A and 2B are then activated, mutual communication is performed between the communication section 113 of the feed unit 1 or 1A (the primary-side unit) and the communication section 214 of the electronic apparatuses 2A and 2B (the secondary-side units). As a result, the feeding parameter is allowed to be obtained in the electronic apparatuses 2A and 2B (step S205).

Then, the control section 114 uses the obtained coupling coefficient k to set the feeding parameter for actual feeding to the electronic apparatuses 2A and 2B (step S206). After that, power feeding (main feeding) from the feed unit 1 or 1A to the electronic apparatuses 2A and 2B is started using the feeding parameter set in such a way (step S207).

In the third embodiment, the control section 114 uses the obtained coupling coefficient k to set the frequencies for the feeding (the feeding frequency or the power transmission frequency). More specifically, for example, when it is assumed that the resonance frequencies in the feed unit 1 and in the electronic apparatuses 2A and 2B are f0, the control section 114 sets the feeding frequency to $(f0/(1-k)^{1/2})$.

The reason is as follows. First, the variation of the power reception voltage when the load 22 receives the power is varied depending on the feeding efficiency. In addition, the power transmission is stable as the variation of the power reception voltage is small. Further, it is known that, when the value of the feeding frequency is $(f0/(1-k)^{1/2})$ as described above, the variation of the power reception voltage becomes the smallest. Accordingly, setting the feeding frequency to the value with use of the obtained coupling coefficient k allows the variation of the power reception voltage to be the smallest, and thus the power transmission becomes stable.

Incidentally, after that, the feeding parameter is appropriately reset (step S208), and it is determined whether the battery 213 is in a full-charged state, or whether the power feeding is to be stopped, according to the setting by a user, the mutual communication, and the like (step S209). When it is determined that the battery 213 is not in the full-charged state and the power feeding is not to be stopped (step S209: N), the power feeding is continued (step S210), and the process returns to step S208 again. On the other hand, it is determined that the battery 213 is in the full-charged state or the power feeding is to be stopped (step S209: Y), the power feeding is stopped (step S211), and the series of feeding operation illustrated in FIG. 14 is ended.

As described above, in the third embodiment, the obtained coupling coefficient k is used to set the feeding parameter. Therefore, for example, it is possible to set not the predetermined fixed feeding parameter but an appropriate feeding parameter according to the magnitude of the coupling coefficient k obtained before the activation of the unit to be fed with power.

In addition, since the obtained coupling coefficient k is used to set the feeding frequency, the variation of the power reception voltage is set to a minimum value and stable power transmission is allowed to be performed.

Fourth Embodiment

Subsequently, a fourth embodiment of the present disclosure is described. In the fourth embodiment, a method of performing operation (object detection operation) detecting whether a unit to be fed with power exists in the vicinity of the feed unit 1 or 1A when the coupling coefficient k is obtained using the method described in the above-described first or second embodiment is described. Note that like numerals are used to designate substantially like components in the first to third embodiments, and the description thereof is appropriately omitted.

A feed system in the fourth embodiment is basically similar to the feed systems 4 and 4A of the first and second embodiments. As described above, the function of performing the object detection operation using the coupling coefficient k that is calculated by the coupling coefficient calculation circuit 112 or the coupling coefficient calculation circuit 112A is mainly performed by the calculation control section 34 and the control section 114 in the feed unit 1 or 1A.

Figure 15:
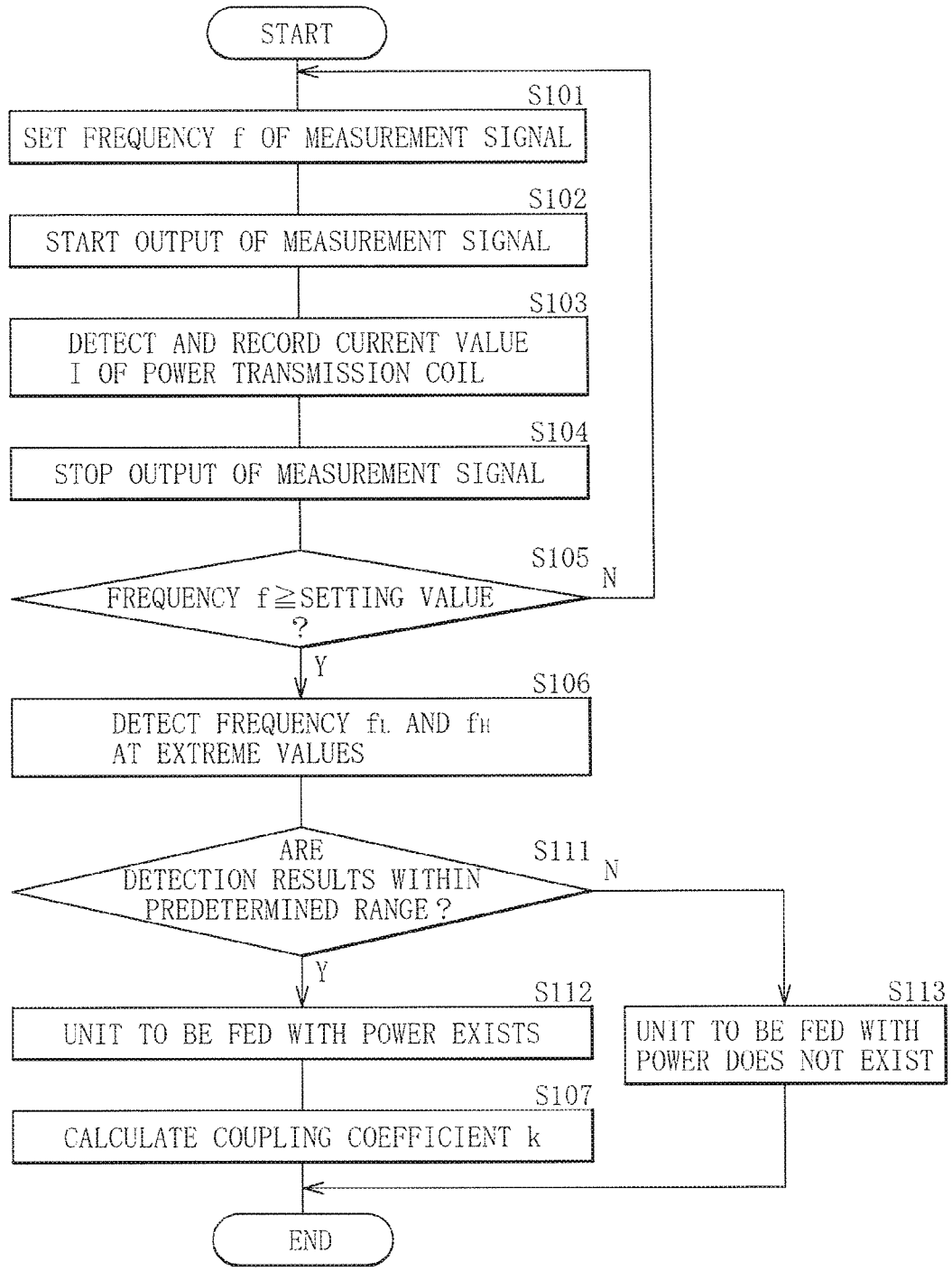
FIG. 15 is a flowchart illustrating an example of operation of calculating a coupling coefficient and operation of detecting whether a unit to be fed with power exists, according to a fourth embodiment.

FIG. 15 is a flowchart illustrating an example of operation of calculating the coupling coefficient and operation of detecting absence or presence of a unit to be fed with power, according to the fourth embodiment. The operation illustrated in FIG. 15 is different from the case where only the operation of calculating the coupling coefficient is performed that is described in the first embodiment in that after the values of the frequencies $f_L$ and $f_H$ at the respective extreme values are detected, the object detection operation is also performed using the result. In other words, the coupling coefficient calculation circuits 112, 112A, etc. use the measurement result of the frequency characteristics of the input impedance Zin to detect whether a unit to be fed with power exists in the vicinity of the feed unit 1 or 1A.

Specifically, the operation example illustrated in FIG. 15 is obtained by modifying the operation example illustrated in FIG. 6 in the following manner. Both the extreme values and the frequencies $f_L$ and $f_H$ at the respective extreme values are detected at step S106, and operation at steps S111 to S113 that will be described later are further added after the step S106.

More specifically, after the extreme values and the frequencies $f_L$ and $f_H$ at the respective extreme values are detected, the coupling coefficient calculation circuit 112, 112A, etc. determine whether the detection results (for example, the values of the frequencies $f_L$ and $f_H$, the values of the input impedance Zin at the respective frequencies, etc.) are within a predetermined range previously set (step S111).

At this time, when it is determined that the detection results are within the predetermined range (step S111: Y), the coupling coefficient calculation circuit 112, 112A, etc. determine that a supposed unit to be fed with power exists in the vicinity of the feed unit 1 (step S112). After that, the process proceeds to the above-described step S107 (calculation of the coupling coefficient k).

On the other hand, when it is determined that the detection results are not within the predetermined range (step S111: N), the coupling coefficient calculation circuit 112, 112A, etc. determine that the supposed unit to be fed with power does not exist in the vicinity of the feed unit 1 (step S113). Therefore, the coupling coefficient k is not calculated in this case, and the operation illustrated in FIG. 15 is ended. The reason why such a determination is allowed is that, when a metal foreign matter such as a coin, a non-contact feed unit of other system, or the like is located in the vicinity of the feed unit 1, the measurement result of the frequency characteristics of the input impedance Zin is not within the predetermined range previously set.

As described above, in the fourth embodiment, detection whether a unit to be fed with power exists in the vicinity of the feed unit 1 is also performed with use of the measurement result of the frequency characteristics of the input impedance Zin. Therefore, the coupling coefficient calculation function is allowed to be used also as the object detection function. In other words, object detection is also performed together with the calculation of the coupling coefficient k, and the unit configuration is allowed to be simplified, reduced in size, and reduced in cost, as compared with the case where both functions are realized by separate modules.

Fifth Embodiment

Subsequently, a fifth embodiment of the present disclosure is described. In the fifth embodiment, a method of performing power transmission control (determination of availability of power feeding, or the like) using the coupling coefficient k that is obtained using the method described in the above-described first or second embodiment, is described. Note that like numerals are used to designate substantially like components in the first to fourth embodiments and the like, and the description thereof is appropriately omitted.

A feed system in the fifth embodiment is basically similar to the feed systems 4 and 4A in the first and second embodiments. As described above, the function of performing the power transmission control using the coupling coefficient k that is calculated by the coupling coefficient calculation circuit 112 or the coupling coefficient calculation circuit 112A is performed mainly by the control section 114 in the feed unit 1 or 1A. In other words, the control section 114 corresponds to a specific example of "power transmission control section" in the present disclosure.

Figure 16:
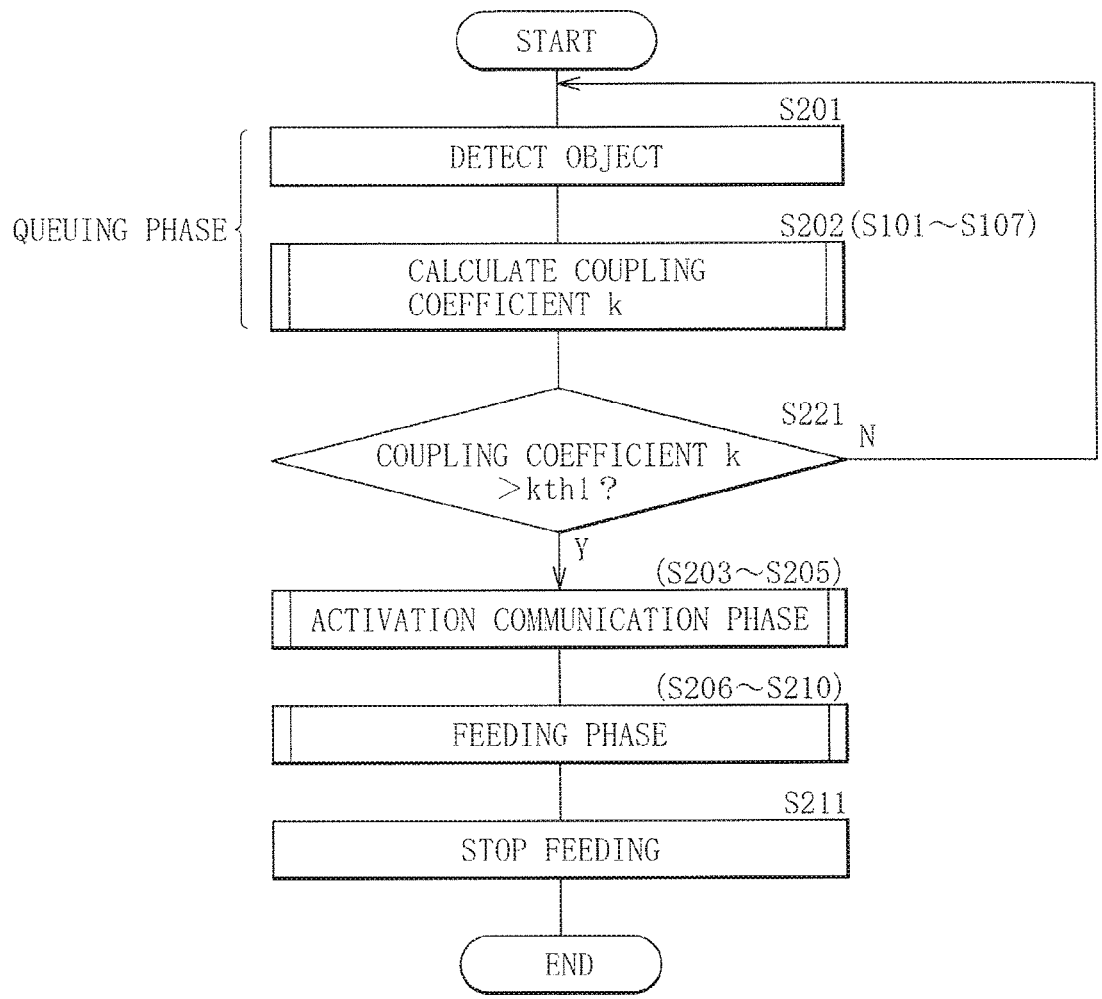
FIG. 16 is a flowchart illustrating an example of power transmission control operation according to a fifth embodiment.

FIG. 16 is a flowchart illustrating an example of power transmission control operation according to the fifth embodiment. In the power transmission control operation, first, the above-described object detection (step S201) and the above-described calculation of the coupling coefficient k (step S202) are performed in the queuing phase.

Subsequently, the control section 114 controls the power transmission operation according to the magnitude of the coupling coefficient k thus obtained. Specifically, in this example, the control section 114 first determines whether the value of the coupling coefficient k is larger than a predetermined threshold kth1 (a first threshold) (whether k>kth1 is satisfied) (step S221).

At this time, when it is determined that the value of the coupling coefficient k is equal to or lower than the threshold kth1 (k≤kth1) (step S221: N), for example, the control section 114 may stop the operation of the AC signal generation circuit 111 and the like to control the power transmission coil L1 not to perform the power transmission. Specifically, in this example, the process returns to the step S201, and the process does not shift to the subsequent activation communication phase (the above-described steps S203 to S205), the feeding phase (the above-described steps S206 to S210), and the like.

On the other hand, when it is determined that the value of the coupling coefficient k is larger than the threshold kth1 (k>kth1) (step S221: Y), the control section 114 controls the power transmission coil L1 to perform the power transmission subsequently. In other words, the process is shifted to the subsequent activation communication phase, and the feeding phase, and the like.

In this way, in the case where the obtained value of the coupling coefficient k is equal to or lower than the threshold kth1 (k kth1), the power transmission control is performed so that the subsequent power transmission is not performed, and thus it is possible to reduce or suppress heat generation, unnecessary radiation, and the like that occur in the non-contact feeding. The reason is as follows.

Specifically, first, when the value of the coupling coefficient k is small, to generate the same power reception voltage by a unit to be fed with power, it is necessary to increase the current flowing through the power transmission coil L1. Therefore, heat generated in the feed unit is increased. Moreover, in association therewith, the magnetic flux penetrating the enclosure of the unit to be fed with power is also increased. Thus, the heat generated in the unit to be fed with power is also increased due to overcurrent loss. On the other hand, unnecessary radiation also tends to be increased when the value of the coupling coefficient k is small. Therefore, as described above, when the obtained value of the coupling coefficient k is small, the power transmission control is performed so that the subsequent power transmission is not performed, and thus it is possible to reduce or suppress heat generation, unnecessary radiation, and the like.

Figure 17:
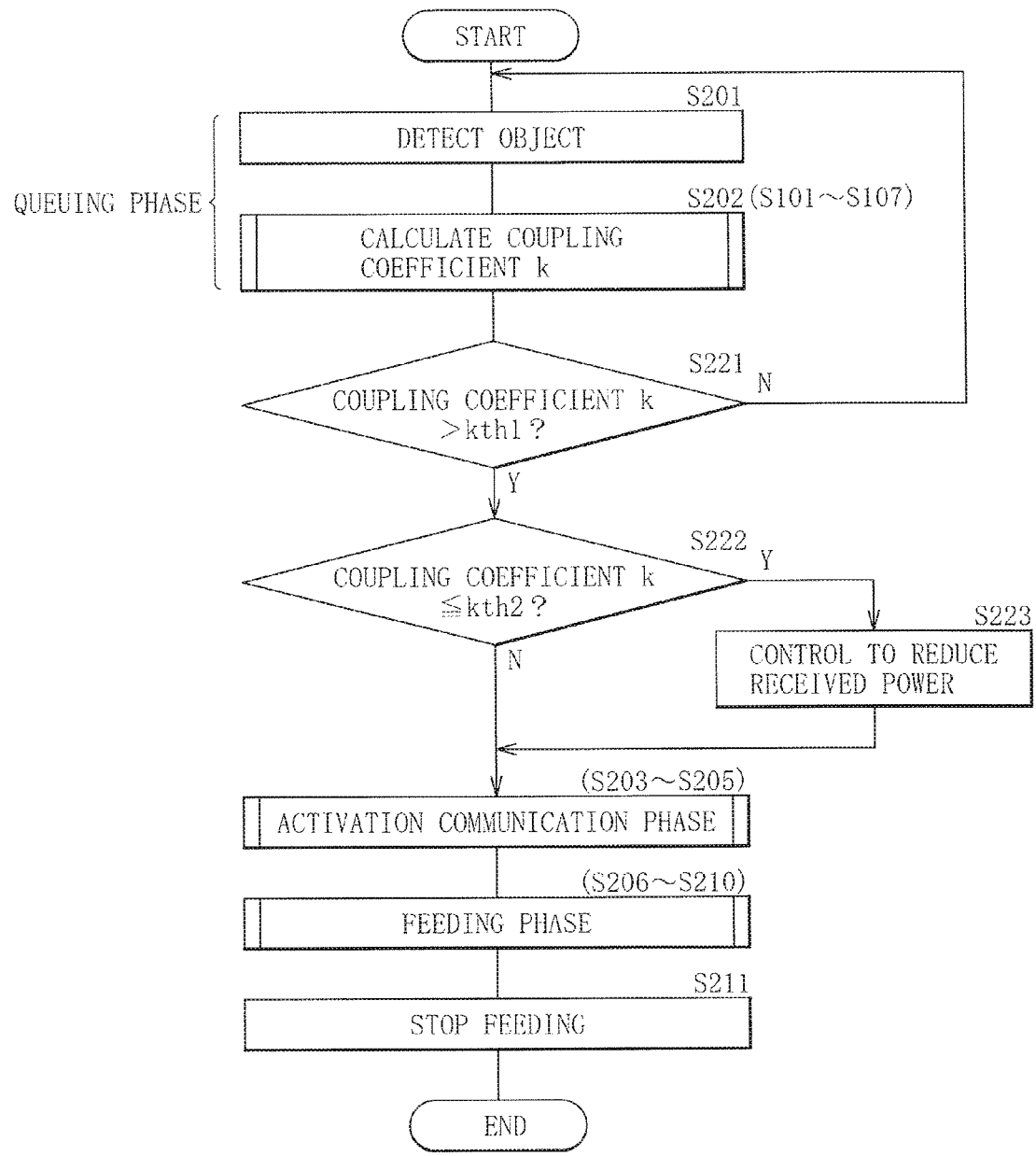
FIG. 17 is a flowchart illustrating another example of the power transmission control operation according to the fifth embodiment.

In the fifth embodiment, for example, the power transmission control operation illustrated in FIG. 17 may be performed. Specifically, when it is determined that the value of the coupling coefficient k is larger than the threshold kth1 (k>kth1) (step S221: Y), determination whether the value of the coupling coefficient k is equal to or lower than another threshold kth2 (>kth1) (second threshold) (determination whether k≤kth2 is satisfied) may be further performed (step S222).

When it is determined that the value of the coupling coefficient k is also larger than the threshold kth2 (k>kth2) (step S222: N), the control section 114 controls the power transmission coil L1 to perform power transmission subsequently. In other words, the process shifts to the subsequent activation communication phase, the feeding phase, and the like.

On the other hand, when the value of the coupling coefficient k is larger than the threshold kth1 and equal to or lower than the threshold kth2 kth2≥k>kth1) (step S222: Y), the control section 114 performs the following power transmission control. The control section 114 performs control so that the process proceeds to the following activation communication phase, the feeding phase, and the like, after the control to decrease the received power by the unit to be fed with power (the received power reducing control) is performed (step S223). When such power transmission control is performed, proper control of the received power becomes possible, and it is possible to further reduce or suppress heat generation, unnecessary radiation, and the like.

Examples of the method of the reducing control of the received power described above may include the following two methods (A) and (B):

(A) a method in which the information of the obtained coupling coefficient k is transmitted from the feed unit 1 to the unit to be fed with power through communication, and the unit to be fed with power determines and controls the received power, (B) a method in which the feed unit 1 determines the received power based on the obtained coupling coefficient k, the information of the received power is transmitted to the unit to be fed with power through communication, and the unit to be fed with power controls the received power.

As described above, in the fifth embodiment, the obtained coupling coefficient k is used to perform the power transmission control (determination of availability of power feeding, and the like). Therefore, it is possible to reduce or suppress heat generation, unnecessary radiation, and the like.

(Other Modifications)

Hereinbefore, although the technology of the present disclosure has been described with referring to the embodiments and the modifications, the technology is not limited thereto, and various modifications may be made.

For example, in the above-described embodiments and the like, various kinds of coils (the power transmission coil and the power reception coil) have been described. However, various kinds of configurations are allowed to be used as the configurations (shapes) of the respective coils. Specifically, for example, each coil may be configured in shapes such as a spiral shape, a loop shape, a bar shape using a magnetic body, an alpha-wound shape configured by folding a spiral coil into two layers, a multilayer spiral shape, and a helical shape configured by winding a wire in a thickness direction thereof. Moreover, each coil is not limited to a winding coil configured of a conductive wire rod, and may be a conductive patterned coil configured of a printed board, a flexible printed board, or the like.

In addition, in the above-described embodiments and the like, although the electronic apparatus has been described as an example of a unit to be fed with power, the unit to be fed with power is not limited thereto, and may be other than the electronic apparatus (for example, vehicles such as electric cars).

Furthermore, in the above-described embodiments and the like, the components of each of the feed unit and the electronic apparatuses have been specifically described. However, all of the components are not necessarily provided, and other components may be further provided. For example, in the feed unit or in the electronic apparatus, a communication function, a control function, a display function, a function of authenticating a secondary-side unit, a function of detecting a contaminant such as a dissimilar metal, and the like may be provided. Moreover, the configuration of the coupling coefficient calculation circuit and the calculation method are also not limited to those described in the above-described embodiments, and the other configuration and other calculation method may be employed. Further, as the power source used in the measurement of the input impedance Zin, in place of the measurement signal generation section described in the above-described embodiments and the like, for example, a feeding driver (the AC signal generation circuit described in the above-described embodiments and the like) may be used.

In addition, in the above-described embodiments and the like, when the rectification circuit is put into the non-operating state, the measurement signal as a weak signal is used. However, the method is not limited thereto, and the other methods may be used. Specifically, for example, a switch may be provided in a preceding stage or a subsequent stage of the rectification circuit, and the switch is set to be OFF state to allow the rectification circuit to be the non-operating state. Alternatively, for example, a rectification circuit capable of switching the state of the rectification function between valid and invalid may be provided, and the switching may be controlled by the control section in the unit to be fed with power to allow the rectification circuit to be the non-operating state.

Moreover, in the above-described embodiments and the like, mainly, the case where the feed system includes a plurality of (two) electronic apparatuses has been described as an example. However, the number of electronic apparatuses is not limited thereto, and the feed system may include only one electronic apparatus.

Moreover, in the above-described embodiments and the like, the charging tray for a small electronic apparatus (CE device) such as a mobile phone has been described as an example of the feed unit. However, the feed unit is not limited to such a household charging tray, and is applicable as a charging unit for various electronic apparatuses, and the like. In addition, the feed unit is not necessarily a tray, and for example, may be a stand for electronic apparatuses such as a so-called cradle.

Note that the technology may be configured as follows.

(1) A feed unit including:

a power transmission coil configured to perform power transmission using a magnetic field;

a coupling coefficient calculation section configured to calculate a coupling coefficient between the power transmission coil and a power reception coil in a unit to be fed with power, wherein the coupling coefficient calculation section measures frequency characteristics of input impedance in a non-operating state of a rectification circuit in the unit to be fed with power, and uses a measurement result of the frequency characteristics to calculate the coupling coefficient.

(2) The feed unit according to (1), wherein the coupling coefficient calculation section detects frequencies at extreme values of the input impedance from the measurement result of the frequency characteristics, and uses the frequencies at the extreme values to calculate the coupling coefficient.

(3) The feed unit according to (2), wherein the coupling coefficient calculation section detects both a frequency at a minimum value of the input impedance and a frequency at a maximum value of the input impedance as frequencies at the extreme values, and uses both the frequencies to calculate the coupling coefficient.

(4) The feed unit according to (3), wherein when a resonance frequency in a resonance circuit including the power transmission coil is denoted by f1 and a resonance frequency in a resonance circuit including the power reception coil is denoted by f2, the resonance frequencies f1 and f2 are set to satisfy (f1<<f2).

(5) The feed unit according to (2), wherein the coupling coefficient calculation section detects frequencies at two minimum values of the input impedance as the frequencies at the extreme values, and uses the frequencies at the two minimum values to calculate the coupling coefficient.

(6) The feed unit according to (5), wherein when a resonance frequency in a resonance circuit including the power transmission coil is denoted by f1 and a resonance frequency in a resonance circuit including the power reception coil is denoted by f2, the resonance frequencies f1 and f2 are set to satisfy (f1=f2).

(7) The feed unit according to any one of (1) to (6), wherein the coupling coefficient calculation section measures the frequency characteristics with use of a weak signal to measure the frequency characteristics in the non-operating state of the rectification circuit.

(8) The feed unit according to (7), wherein the rectification circuit is put into the non-operating state when the weak signal passes through a bypass route with respect to the rectification circuit in the unit to be fed with power.

(9) The feed unit according to (8), wherein
the bypass route is disposed between a pair of input terminals of the rectification circuit, and
a capacitor or a parasitic capacitance component is provided on the bypass route.

(10) The feed unit according to any one of (1) to (9), further including
an AC signal generation section configured to supply, to the power transmission coil, an AC signal to perform the power transmission, wherein
the AC signal generation section is in the non-operating state in addition to the rectification circuit when the frequency characteristics are measured.

(11) The feed unit according to any one of (1) to (10), wherein
the coupling coefficient calculation section includes
a measurement signal generation section configured to generate a measurement signal to measure the frequency characteristics,
a current detection section configured to detect a current flowing through the power transmission coil,
a control section configured to control a voltage and a frequency of the measurement signal, and
a calculation section configured to calculate the input impedance based on the current detected by the current detection section and the voltage set by the control section, and
the control section continuously varies the frequency of the measurement signal to allow the calculation section to obtain the frequency characteristics.

(12) The feed unit according to any one of (1) to (11), further including
a parameter setting section configured to set a parameter in the power transmission with use of the coupling coefficient calculated by the coupling coefficient calculation section.

(13) The feed unit according to (12), wherein
the coupling coefficient calculation section calculates the coupling coefficient before activation of the unit to be fed with power, and
the parameter setting section varies a parameter in an activation signal of the unit to be fed with power according to magnitude of the coupling coefficient calculated by the coupling coefficient calculation section.

(14) The feed unit according to (13), wherein the parameter setting section sets a voltage of the activation signal to satisfy inverse relationship with respect to the coupling coefficient.

(15) The feed unit according to any one of (12) to (14), wherein the parameter setting section uses the coupling coefficient calculated by the coupling coefficient calculation section to set a power transmission frequency in the power transmission.

(16) The feed unit according to any one of (1) to (15), wherein the coupling coefficient calculation section uses the measurement result of the frequency characteristics to detect whether the unit to be fed with power exists in the vicinity of the feed unit.

(17) The feed unit according to (16), wherein the coupling coefficient calculation section detects whether the unit to be fed with power exists in the vicinity of the feed unit depending on whether the measurement result of the frequency characteristics is within a predetermined range.

(18) The feed unit according to any one of (1) to (17), further including
a power transmission control section configured to control operation in the power transmission according to magnitude of the coupling coefficient calculated by the coupling coefficient calculation section, wherein
the power transmission control section does not perform the power transmission when the coupling coefficient is equal to or lower than a first threshold.

(19) The feed unit according to (18), wherein the power transmission control section performs the power transmission after control of decreasing received power is performed in the unit to be fed with power when the coupling coefficient is larger than the first threshold and equal to or lower than a second threshold.

(20) A feed system provided with one or a plurality of electronic apparatuses and a feed unit, the one or the plurality of electronic apparatuses each having a power reception coil and a rectification circuit, the feed unit being configured to perform power transmission using a magnetic field to the electronic apparatuses, the feed unit including:
a power transmission coil configured to perform the power transmission;
a coupling coefficient calculation section configured to calculate a coupling coefficient between the power transmission coil and the power reception coil, wherein
the coupling coefficient calculation section measures frequency characteristics of input impedance in a non-operating state of the rectification circuit, and uses a measurement result of the frequency characteristics to calculate the coupling coefficient.

It should be understood by those skilled in the art that various modifications, combinations, sub-combinations, and alterations may occur depending on design requirements and other factors insofar as they are within the scope of the appended claims or the equivalents thereof.

What is claimed is:

1. A feed unit comprising:
a power transmission coil configured to transmit power to a power reception coil of a receiving unit using a magnetic field;
a coupling coefficient calculation section configured to
measure frequency characteristics of input impedance of a rectification circuit of the receiving unit, the rectification circuit being in a non-operating state, and
calculate a coupling coefficient between the power transmission coil and the power reception coil using the frequency characteristics of the input impedance of the rectification circuit that have been measured; and
an AC signal generation section configured to supply an AC signal to the power transmission coil, wherein the AC signal generation section and the rectification circuit are in non-operating states when the frequency characteristics are measured by the coupling coefficient calculation section, wherein
the coupling coefficient calculation section includes
a measurement signal generation section configured to generate a measurement signal to measure the frequency characteristics,
a current detection section configured to detect a current flowing through the power transmission coil,
a control section configured to control a voltage and a frequency of the measurement signal, and
a calculation section configured to calculate the input impedance based on the current detected by the current detection section and the voltage that is set by the control section,
wherein the control section is configured to continuously vary the frequency of the measurement signal, and
wherein responsive to the control section continuously varying the frequency of the measurement signal, the calculation section is configured to obtain the frequency characteristics.

2. The feed unit according to claim 1, wherein the coupling coefficient calculation section is further configured to
detect frequencies at extreme values of the input impedance from the frequency characteristics that have been measured, and
calculate the coupling coefficient using the frequencies at the extreme values.

3. The feed unit according to claim 2, wherein, to detect the frequencies at the extreme values of the input impedance, the coupling coefficient calculation section is further configured to detect a first frequency at a minimum value of the input impedance and a second frequency at a maximum value of the input impedance, and
wherein, to calculate the coupling coefficient using the frequencies at the extreme values, the coupling coefficient calculation section is further configured to calculate the coupling coefficient using the first frequency and the second frequency.

4. The feed unit according to claim 3, further comprising a first resonance circuit that includes the power transmission coil, wherein when a first resonance frequency in the first resonance circuit is denoted by f1 and a second resonance frequency in a second resonance circuit of the receiving unit that includes the power reception coil is denoted by f2, the resonance frequencies f1 and f2 are set to satisfy (f1<<f2).

5. The feed unit according to claim 2, wherein, to detect the frequencies at the extreme values of the input impedance, the coupling coefficient calculation section is further configured to detect frequencies at two minimum values of the input impedance as the frequencies at the extreme values, and
wherein, to calculate the coupling coefficient using the frequencies at the extreme values, the coupling coefficient calculation section is further configured to calculate the coupling coefficient using the frequencies at the two minimum values.

6. The feed unit according to claim 5, further comprising a first resonance circuit that includes the power transmission coil, wherein when a first resonance frequency in the first resonance circuit is denoted by f1 and a second resonance frequency in a second resonance circuit of the receiving unit that includes the power reception coil is denoted by f2, the resonance frequencies f1 and f2 are set to satisfy (f1=f2).

7. The feed unit according to claim 1, wherein the power transmission coil is further configured to transmit a weak signal, and
wherein, to measure the frequency characteristics in the non-operating state of the rectification circuit, the coupling coefficient calculation section is configured to measure the frequency characteristics with the weak signal.

8. The feed unit according to claim 1, wherein the control section further includes a parameter setting section that is configured to set a parameter in transmission of the power from the power transmission coil based on the coupling coefficient.

9. The feed unit according to claim 8, wherein
the coupling coefficient calculation section is configured to calculate the coupling coefficient before an activation of the receiving unit,
the power transmission coil is configured to transmit an activation signal, and
the parameter setting section is configured to vary a parameter in the activation signal according to a magnitude of the coupling coefficient that is calculated by the coupling coefficient calculation section.

10. The feed unit according to claim 9, wherein the parameter setting section is configured to set a voltage of the activation signal to satisfy an inverse relationship with respect to the coupling coefficient.

11. The feed unit according to claim 8, wherein the parameter setting section is configured to set a power transmission frequency in transmission of the power from the power transmission coil based on the coupling coefficient.

12. The feed unit according to claim 1, wherein the coupling coefficient calculation section is further configured determine whether the receiving unit is within a vicinity of the feed unit based on the frequency characteristics.

13. The feed unit according to claim 12, wherein the coupling coefficient calculation section is further configured to determine that the receiving unit is within the vicinity of the feed unit when the frequency characteristics are within a predetermined range.

14. The feed unit according to claim 1, wherein the control section further includes a power transmission control section that is configured to control the power that is transmitted from the power transmission coil according to a magnitude of the coupling coefficient calculated by the coupling coefficient calculation section, wherein
the power transmission control section is configured to control the power transmission coil to not transmit the power when the coupling coefficient is equal to or lower than a first threshold.

15. The feed unit according to claim 14, wherein the power transmission control section is configured to control the power transmission coil to transmit the power when the coupling coefficient is larger than the first threshold and equal to or lower than a second threshold.

16. A feed system comprising:
one or more electronic apparatuses, each of the one or more electronic apparatuses having a power reception coil and a rectification circuit; and
a feed unit including
a power transmission coil configured to transmit power to at least one power reception coil of the one or more electronic apparatuses using a magnetic field;
a coupling coefficient calculation section configured to
measure frequency characteristics of input impedance of the rectification circuit of the one or more electronic apparatuses, the rectification circuit being in a non-operating state, and
calculate a coupling coefficient between the power transmission coil and the power reception coil using the frequency characteristics of the input impedance of the rectification circuit that have been measured; and
an AC signal generation section configured to supply an AC signal to the power transmission coil, wherein the AC signal generation section and the rectification circuit are in non-operating states when the frequency characteristics are measured by the coupling coefficient calculation section, wherein
the coupling coefficient calculation section includes
a measurement signal generation section configured to generate a measurement signal to measure the frequency characteristics,
a current detection section configured to detect a current flowing through the power transmission coil,
a control section configured to control a voltage and a frequency of the measurement signal, and
a calculation section configured to calculate the input impedance based on the current detected by the current detection section and the voltage that is set by the control section,
wherein the control section is configured to continuously vary the frequency of the measurement signal, and
wherein responsive to the control section continuously varying the frequency of the measurement signal, the calculation section is configured to obtain the frequency characteristics.

17. The feed system according to claim 16, wherein a first electronic apparatus of the one or more electronic apparatuses is configured to
receive a weak signal that passes through a bypass route with respect to the rectification circuit of the first electronic apparatus, the bypass route is disposed between a pair of input terminals of the rectification circuit of the first electronic apparatus, and wherein a capacitor or a parasitic capacitance component is provided on the bypass route, and
responsive to receiving the weak signal that passes through the bypass route, the rectification circuit of the first electronic apparatus remains in the non-operating state.

* * * * *